(12) United States Patent
Chung et al.

(10) Patent No.: US 11,618,536 B2
(45) Date of Patent: Apr. 4, 2023

(54) HEAT-INSULATING STRUCTURAL MATERIAL, AND LOW TEMPERATURE AND ULTRA-LOW TEMPERATURE LIQUEFIED GAS CARRIER USING THE SAME

(71) Applicant: Tae Young Chung, Seoul (KR)

(72) Inventors: Tae Young Chung, Seoul (KR); Kong Ju Park, Seoul (KR)

(*) Notice: Subject to any disclaimer, the term of this patent is extended or adjusted under 35 U.S.C. 154(b) by 291 days.

(21) Appl. No.: 16/646,531

(22) PCT Filed: Sep. 5, 2018

(86) PCT No.: PCT/KR2018/010365
§ 371 (c)(1),
(2) Date: Mar. 11, 2020

(87) PCT Pub. No.: WO2019/054692
PCT Pub. Date: Mar. 21, 2019

(65) Prior Publication Data
US 2020/0277781 A1  Sep. 3, 2020

(30) Foreign Application Priority Data

Sep. 12, 2017 (KR) .................. 10-2017-0116617
May 21, 2018 (KR) .................. 10-2018-0057690

(51) Int. Cl.
*E04C 1/00* (2006.01)
*B63B 73/20* (2020.01)
(Continued)

(52) U.S. Cl.
CPC .......... *B63B 73/20* (2020.01); *B32B 3/06* (2013.01); *B32B 3/085* (2013.01); *B32B 7/08* (2013.01);
(Continued)

(58) Field of Classification Search
CPC .................. B32B 3/06; B32B 3/085
(Continued)

(56) References Cited

U.S. PATENT DOCUMENTS 3,298,345 A * 1/1967 Pratt ................... B04C 5/16
220/901
3,341,050 A * 9/1967 Forman ............... F17C 3/025
428/116
(Continued)

FOREIGN PATENT DOCUMENTS

CN 1761550 A 4/2006
EP 1827817 A 9/2007
(Continued)

OTHER PUBLICATIONS

European Search Report and Written Opinion dated May 31, 2021 for related European Patent Application No. 18856912.3.
(Continued)

*Primary Examiner* — Basil S Katcheves

(57) ABSTRACT

The present invention relates to a heat-insulating structural material, which: firstly, can minimize or prevent a thermal bridge by improving the structure of the connection part of the heat-insulating structural material; secondly, improves insulation performance by arranging a vacuum insulation material inside the core layer of the heat-insulating structural material; and thirdly, increases structural stiffness by forming the core layer from a non-foaming polymer material having excellent structural performance, prevents gas from moving in or out of the vacuum insulation material through the air-tight adhesive structure of the core layer, and can improve fire protection performance so as not to be vulnerable to fire, and thus the present invention is universally applicable to fields requiring insulation ability and structural performance.

20 Claims, 28 Drawing Sheets

(51) Int. Cl.
   *B32B 3/06* (2006.01)
   *B32B 3/08* (2006.01)
   *B32B 7/08* (2019.01)
   *B32B 15/095* (2006.01)
   *B32B 15/18* (2006.01)
   *B32B 27/40* (2006.01)
   *E04B 1/76* (2006.01)
   *E04B 1/80* (2006.01)
   *E04C 2/292* (2006.01)
   *F17C 3/08* (2006.01)
   *B63B 25/16* (2006.01)

(52) U.S. Cl.
   CPC ........... *B32B 15/095* (2013.01); *B32B 15/18* (2013.01); *B32B 27/40* (2013.01); *E04B 1/7612* (2013.01); *E04B 1/803* (2013.01); *E04C 2/292* (2013.01); *F17C 3/08* (2013.01); *B32B 2305/77* (2013.01); *B32B 2307/304* (2013.01); *B32B 2605/12* (2013.01); *B32B 2607/00* (2013.01); *B63B 25/16* (2013.01); *F17C 2221/035* (2013.01); *F17C 2260/033* (2013.01)

(58) Field of Classification Search
   USPC ...................................................... 52/309.14
   See application file for complete search history.

(56) References Cited

U.S. PATENT DOCUMENTS

| | | | | | |
|---|---|---|---|---|---|
| 3,357,146 | A | * | 12/1967 | Gartrell | ................... E04C 2/292 52/592.4 |
| 3,732,138 | A | * | 5/1973 | Almog | ...................... B32B 5/18 428/416 |
| 4,273,818 | A | * | 6/1981 | Buchs | ................... B29D 24/005 428/116 |
| 5,778,813 | A | * | 7/1998 | Kennedy | ................... B63B 5/00 114/69 |
| 6,050,208 | A | * | 4/2000 | Kennedy | ................... B63B 3/14 114/356 |
| 6,138,435 | A | * | 10/2000 | Kocher | ...................... B32B 5/18 52/800.1 |
| 6,418,686 | B1 | * | 7/2002 | Record | ................... E04C 2/288 52/412 |
| 7,877,960 | B2 | * | 2/2011 | Kennedy | ................. E04C 2/292 52/592.1 |
| 9,611,646 | B2 | * | 4/2017 | Martin | ..................... E04C 2/384 |
| 2002/0108323 | A1 | * | 8/2002 | Gruber | ................... E04F 15/02 52/800.1 |
| 2009/0272056 | A1 | * | 11/2009 | Koupal | ................. E04B 1/6162 52/309.4 |

FOREIGN PATENT DOCUMENTS

| | | |
|---|---|---|
| GB | 190932 A | 1/1923 |
| JP | 2000297981 A | 10/2000 |
| KR | 20110067494 A | 6/2011 |
| KR | 20120035952 A | 4/2012 |
| WO | 2006067433 A1 | 6/2006 |

OTHER PUBLICATIONS

International Search Report dated Dec. 11, 2018 for PCT application PCT/KR2018/010365.
The First Office Action dated Sep. 7, 2021 for related Chinese Patent Application No. 201880070151.0.

* cited by examiner

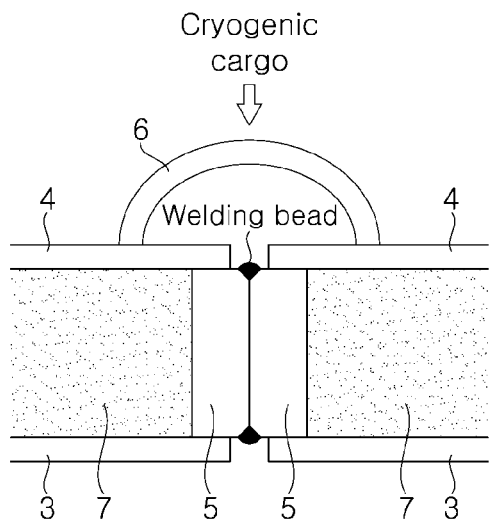
[FIG. 1A]
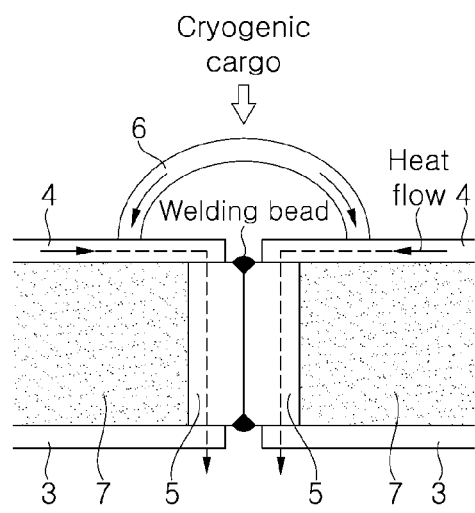
[FIG. 1B]
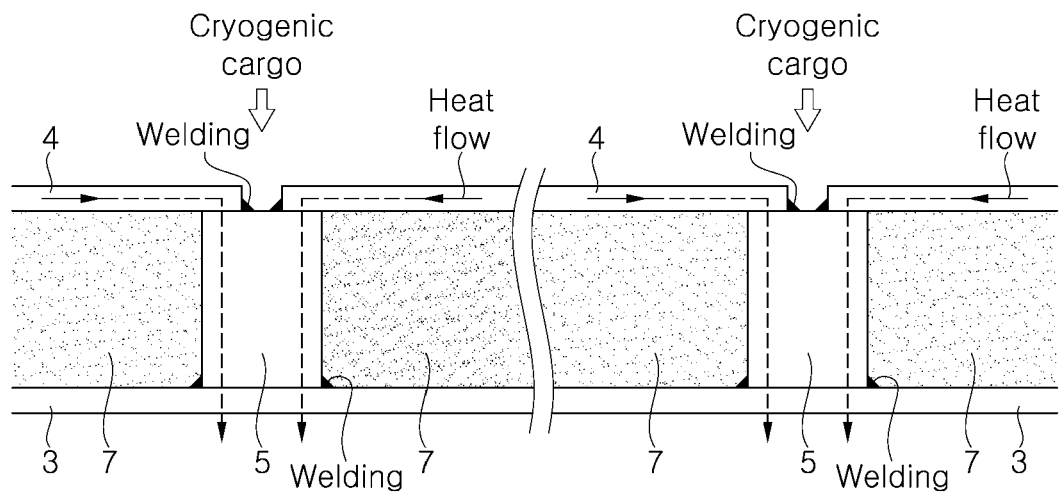
[FIG. 1C]

[FIG. 2]
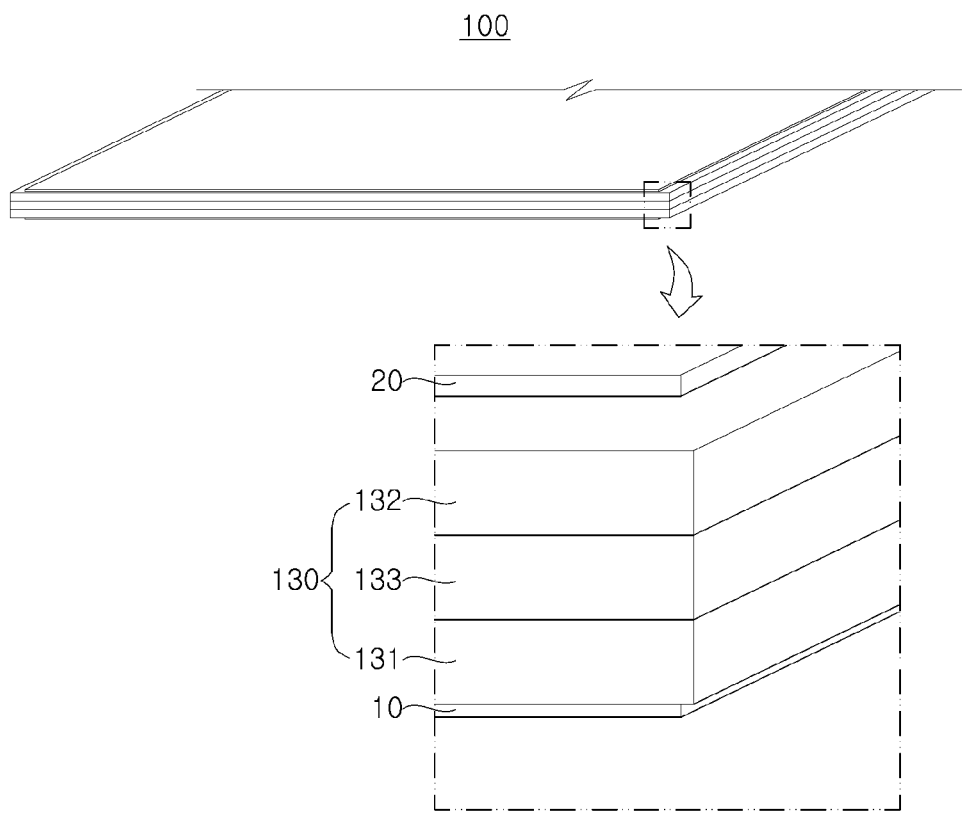

[FIG. 3A]
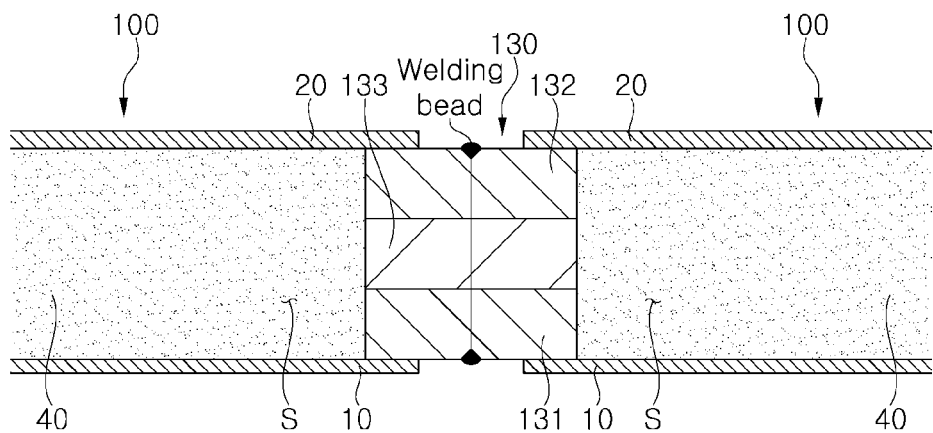
[FIG. 3B]
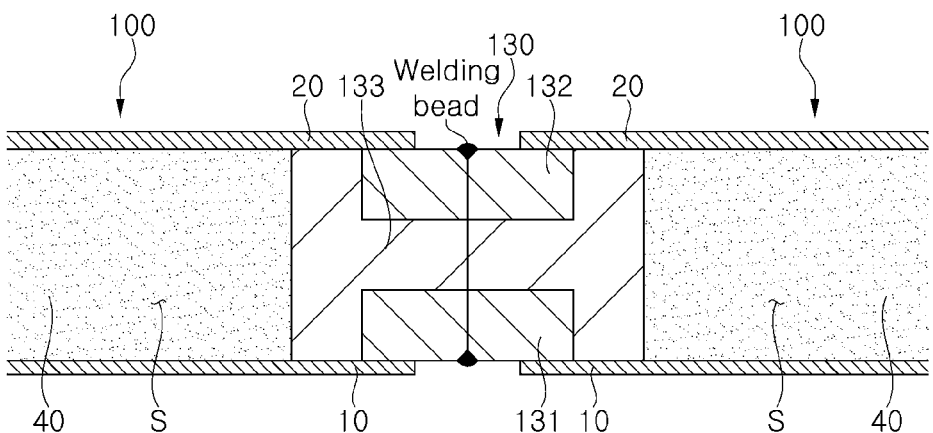
[FIG. 4]
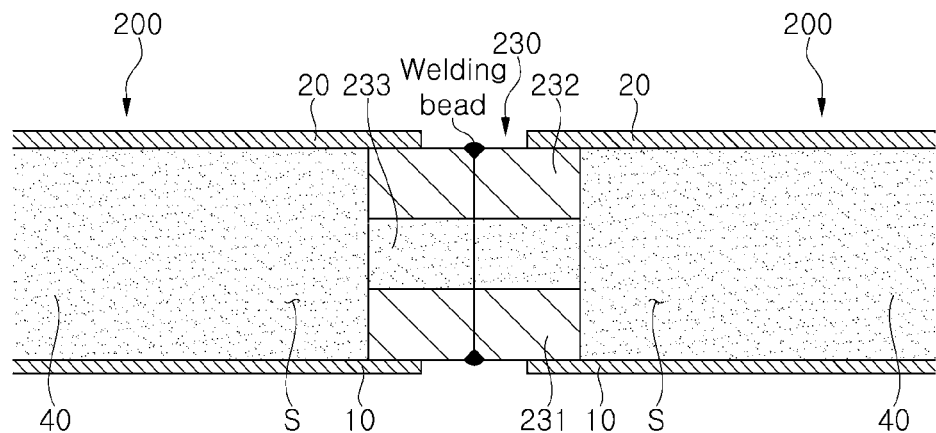

[FIG. 5]
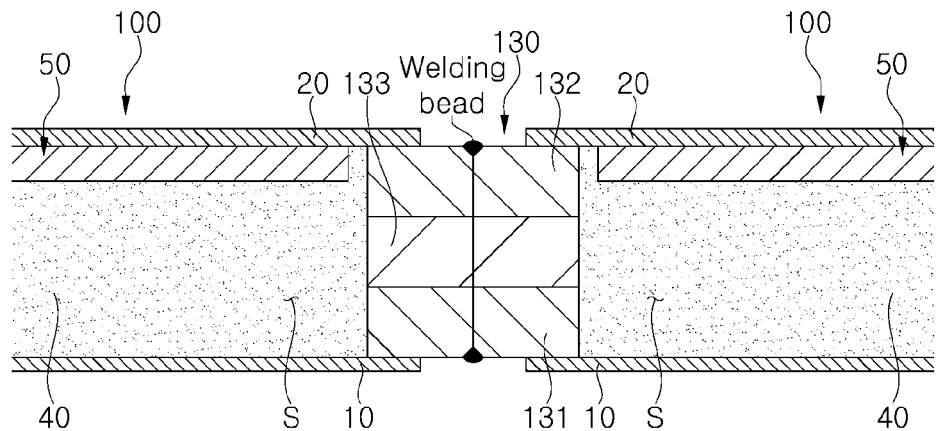
[FIG. 6]
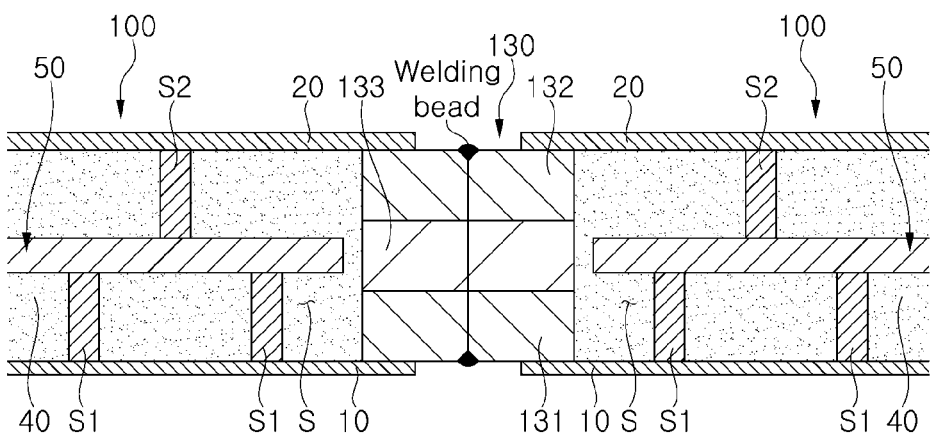
[FIG. 7]
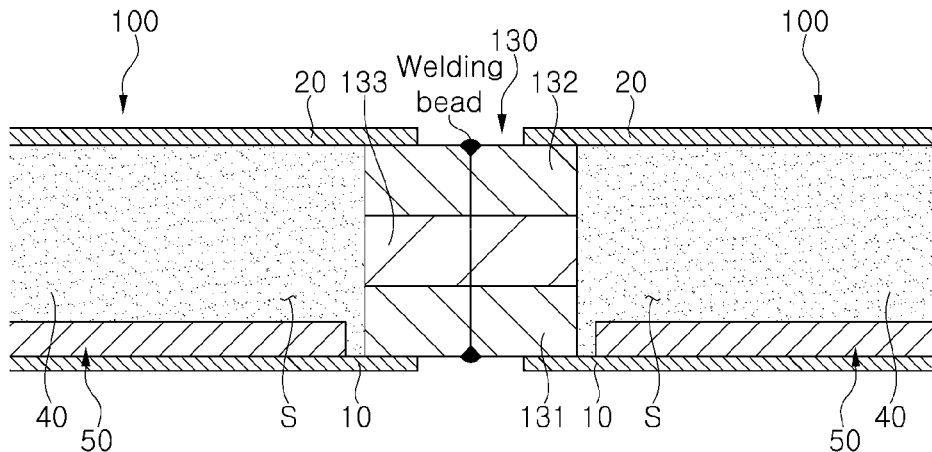

[FIG. 8]
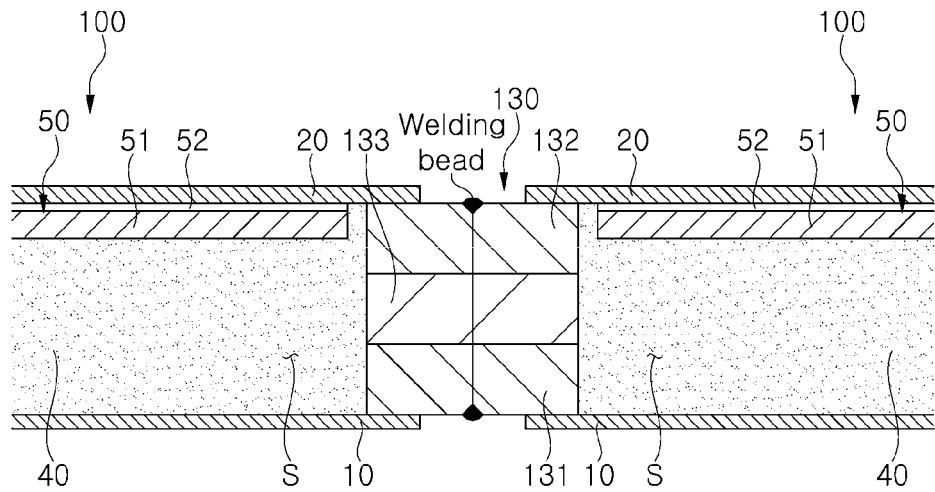
[FIG. 9]
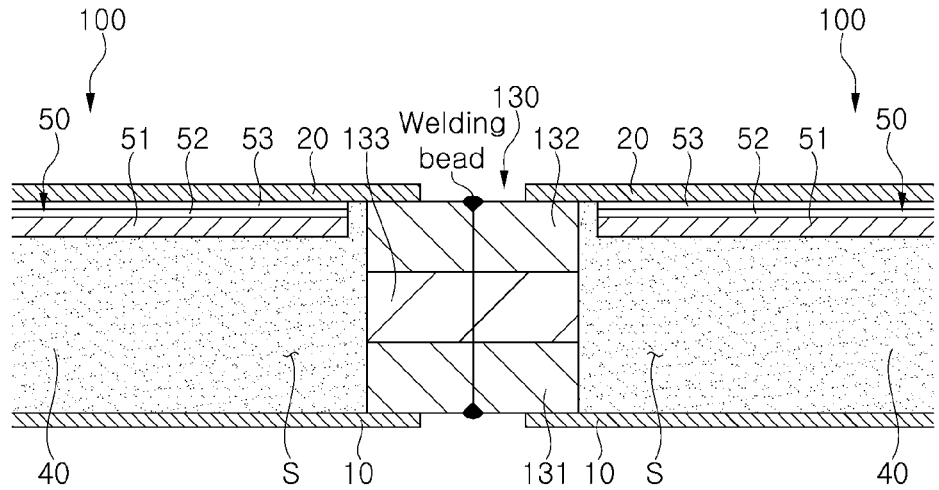

[FIG. 10]
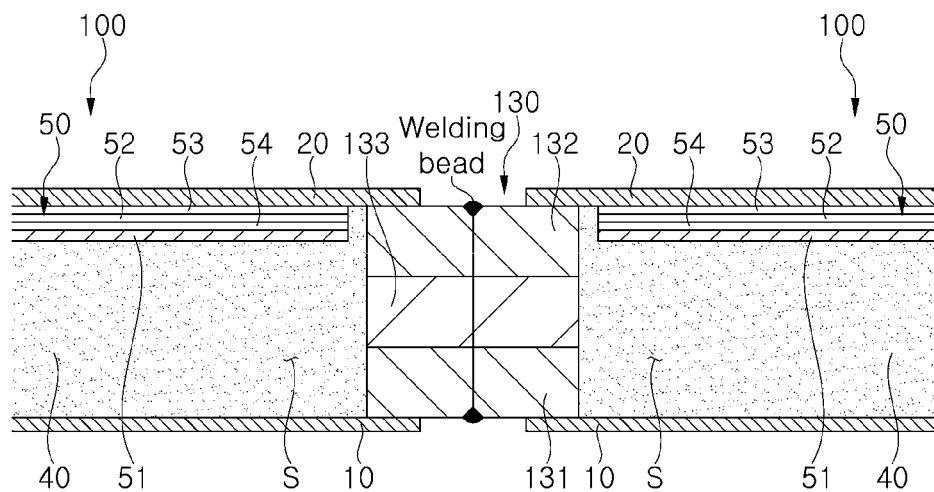

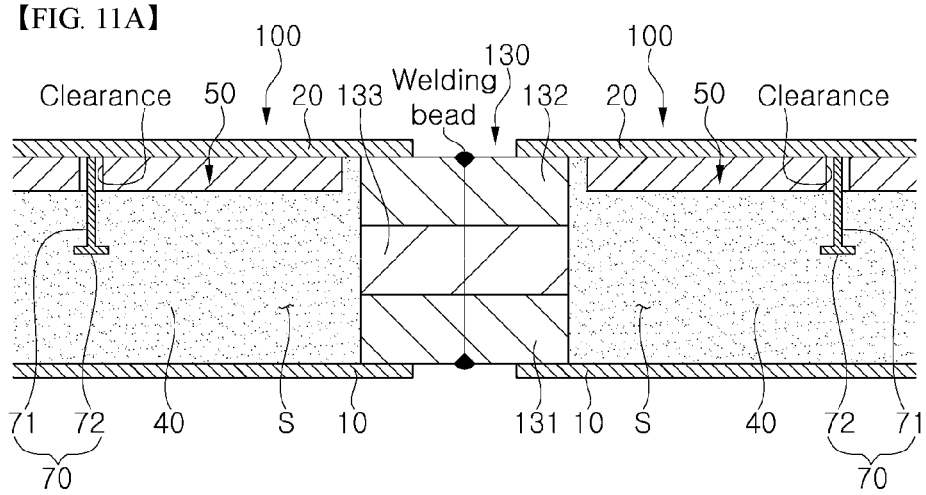
[FIG. 11A]
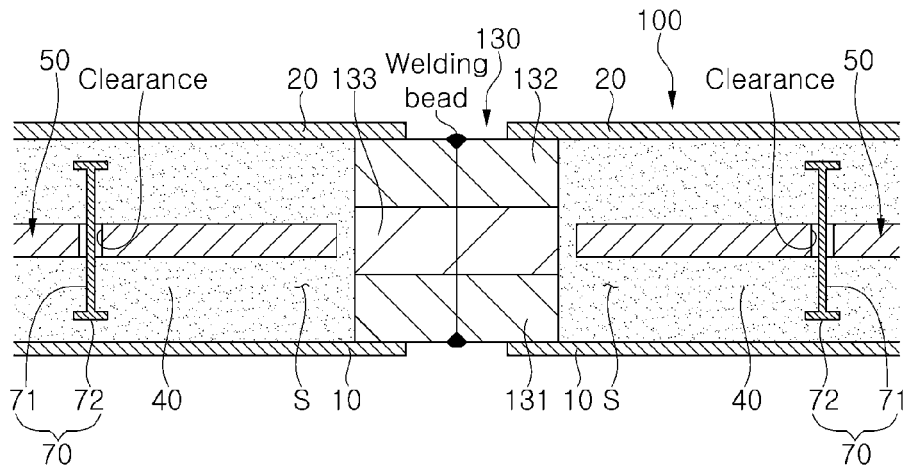
[FIG. 11B]
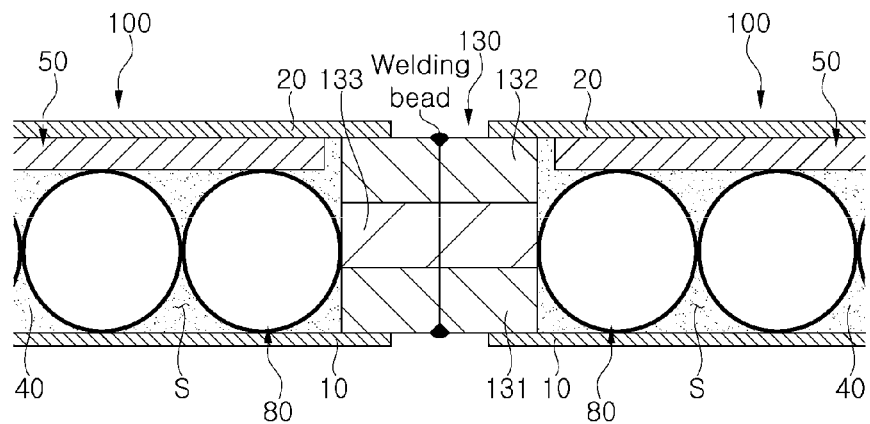
[FIG. 12]

【FIG. 13】
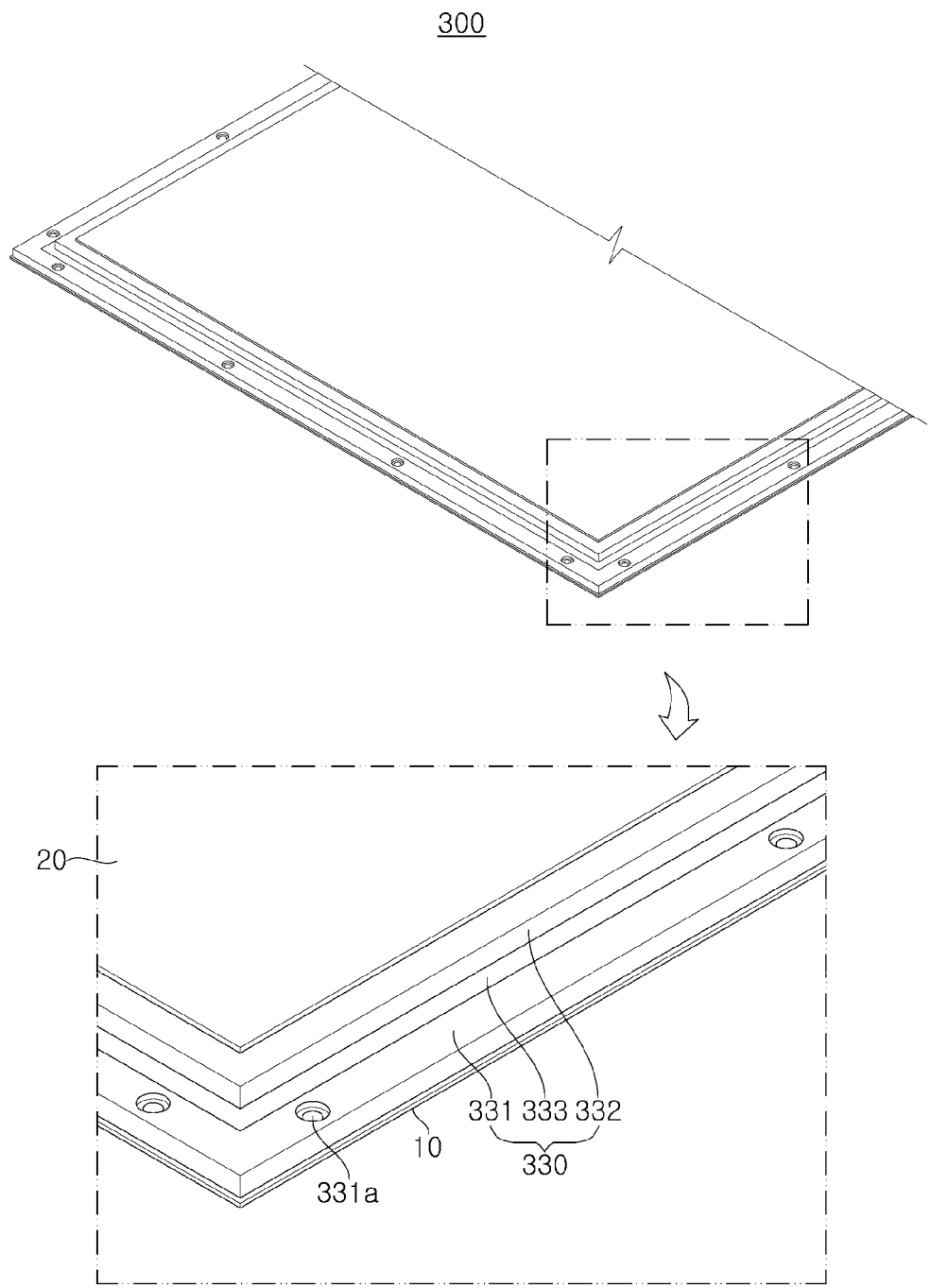

[FIG. 14]
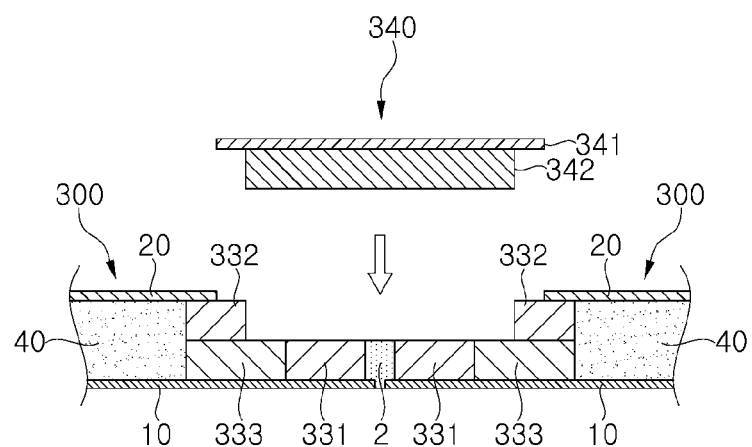

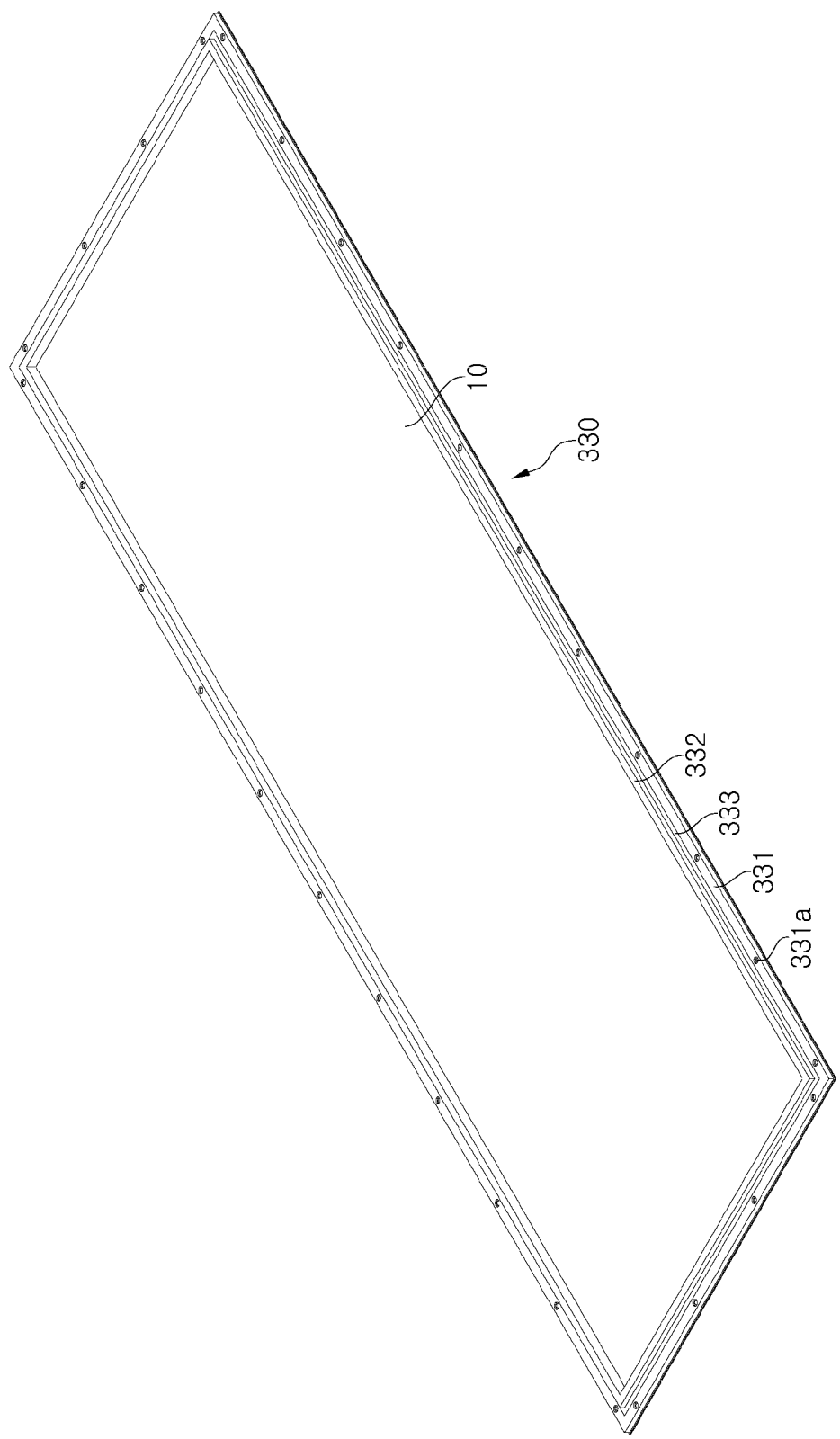
[FIG. 15]

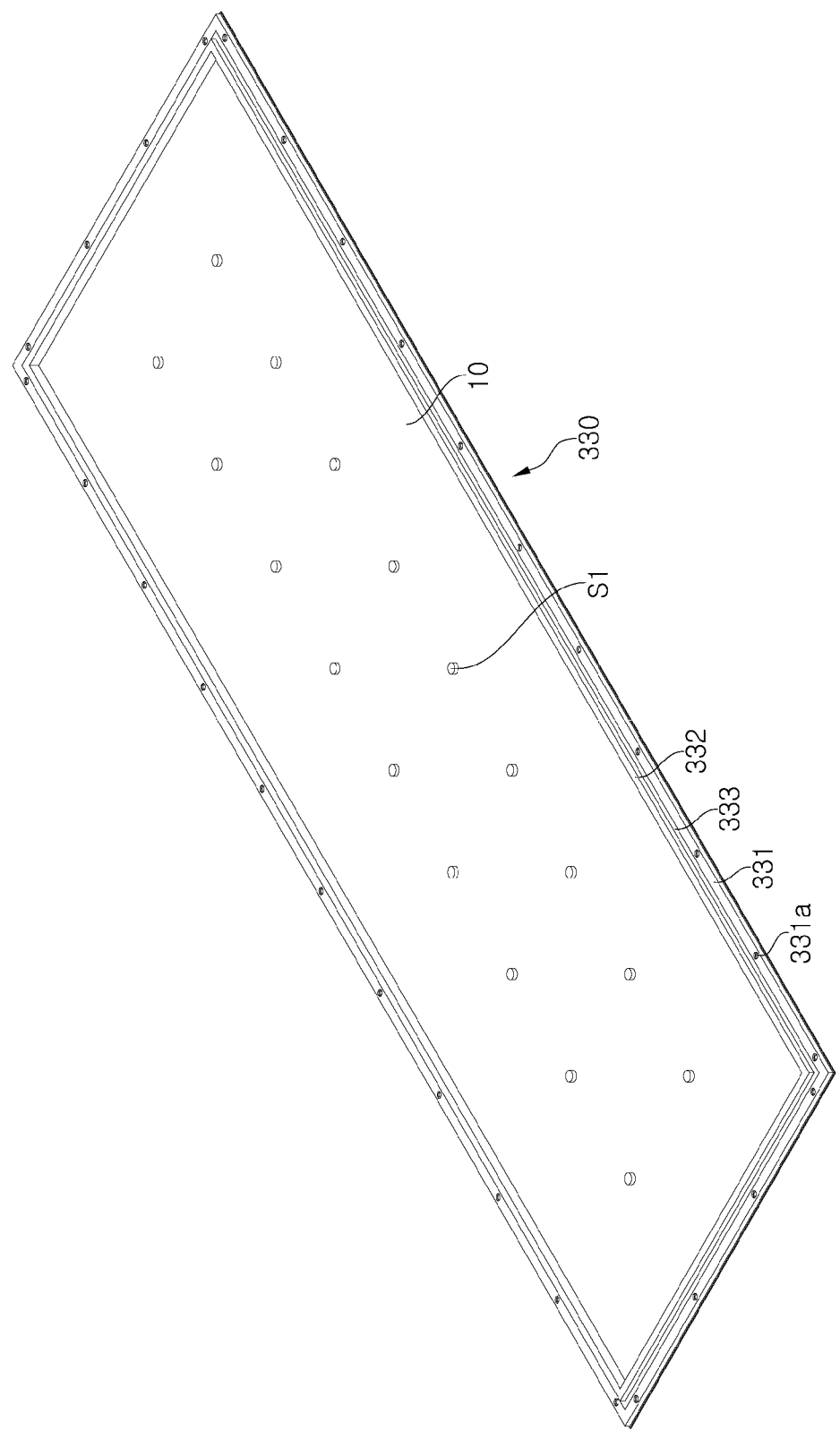
[FIG. 16]

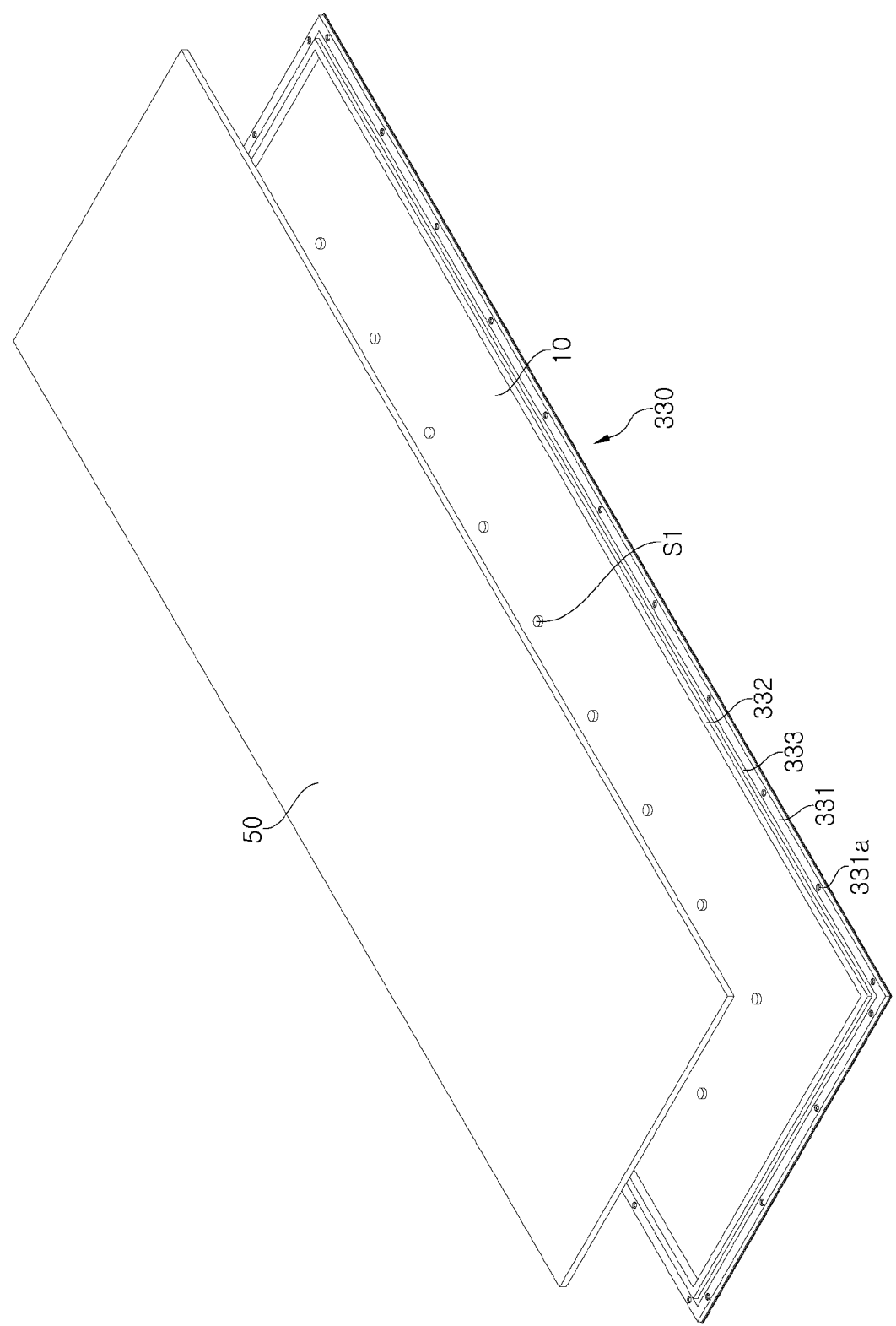
[FIG. 17]

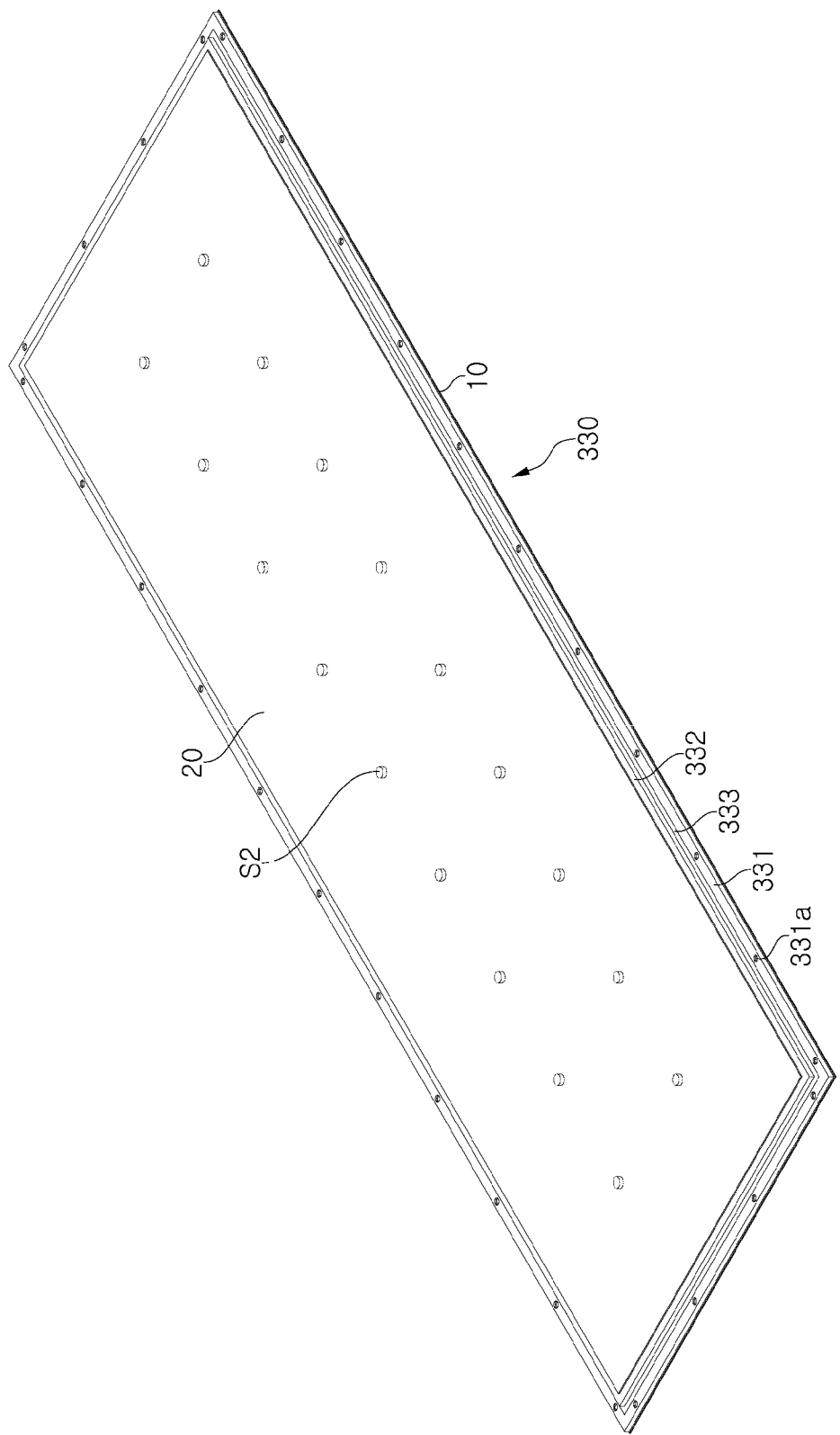
[FIG. 18]

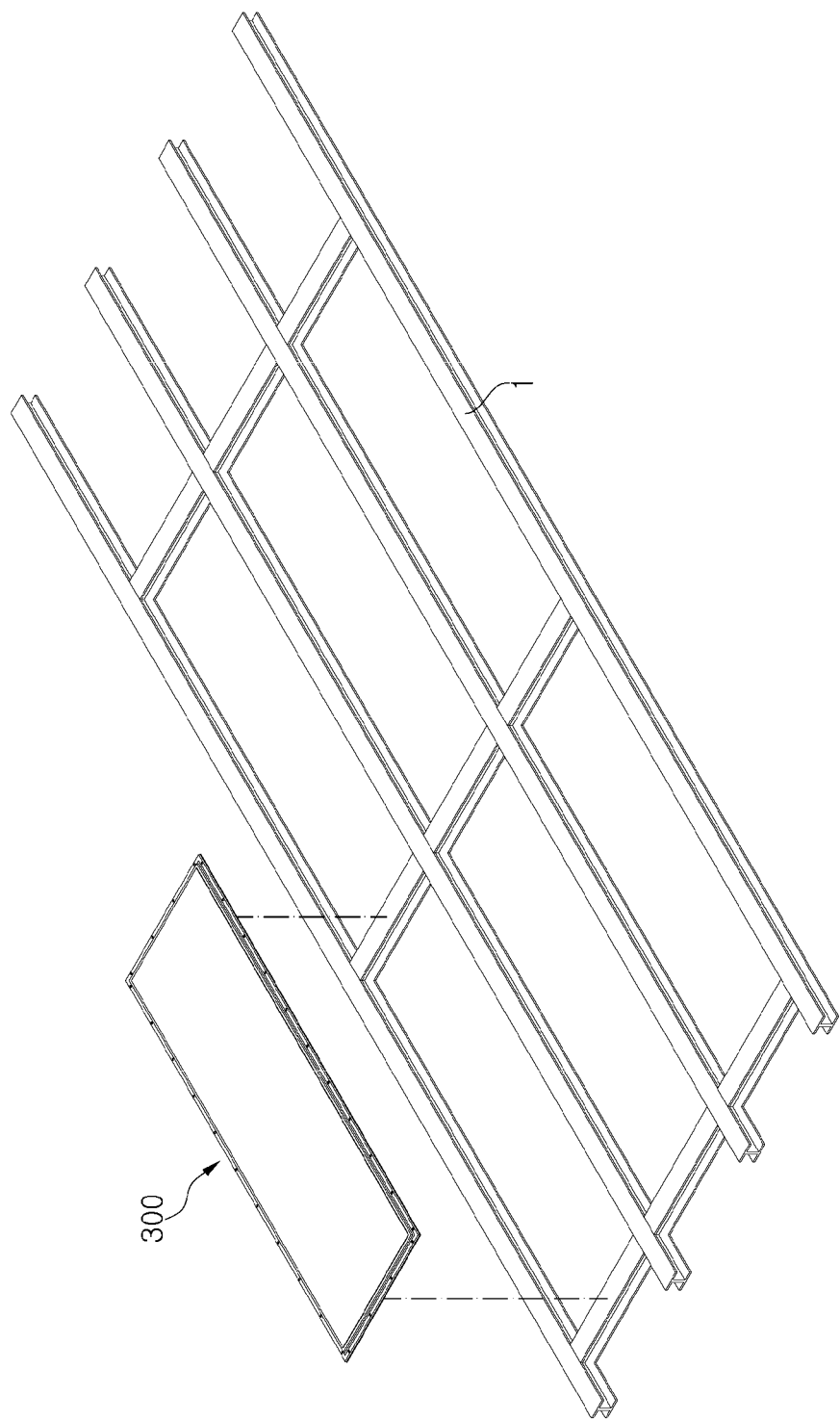
[FIG. 19]

[FIG. 20]
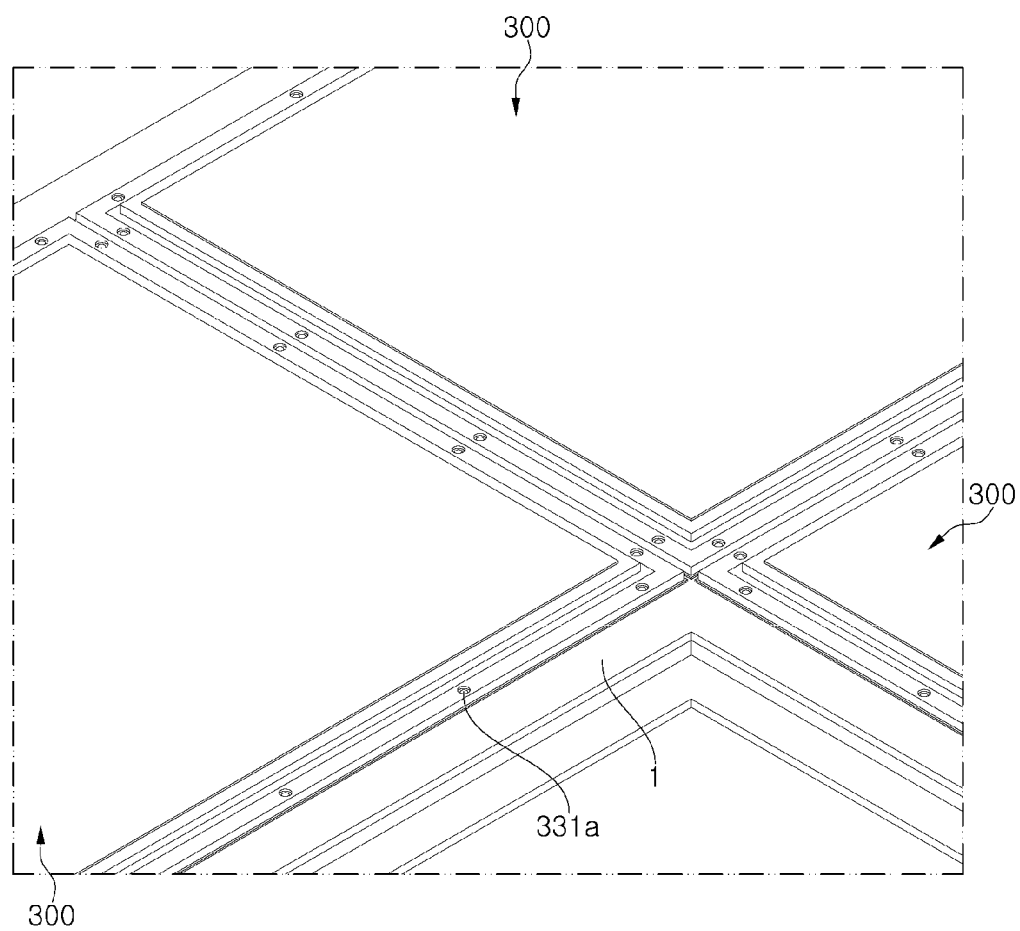

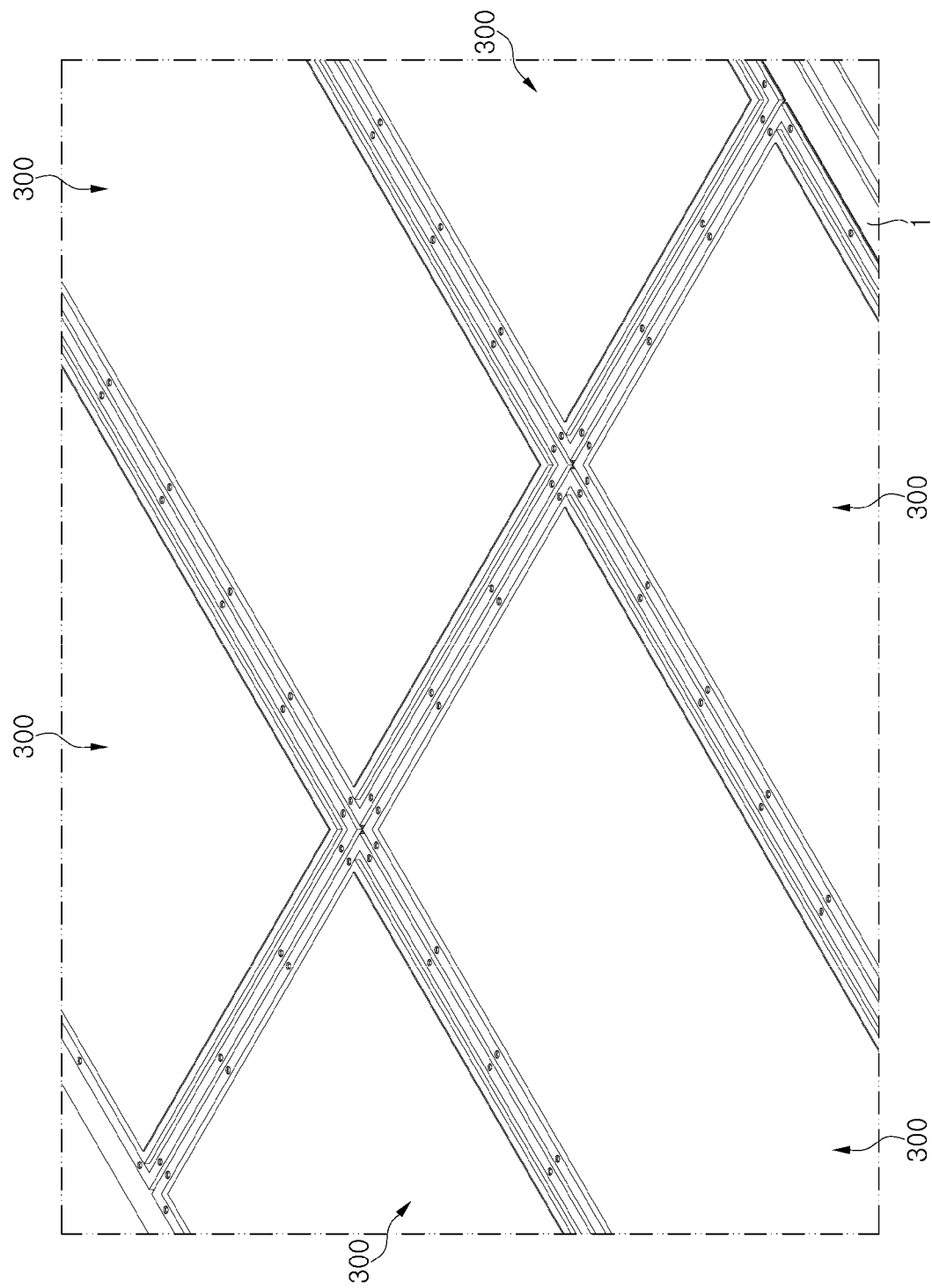
[FIG. 21]

【FIG. 22】
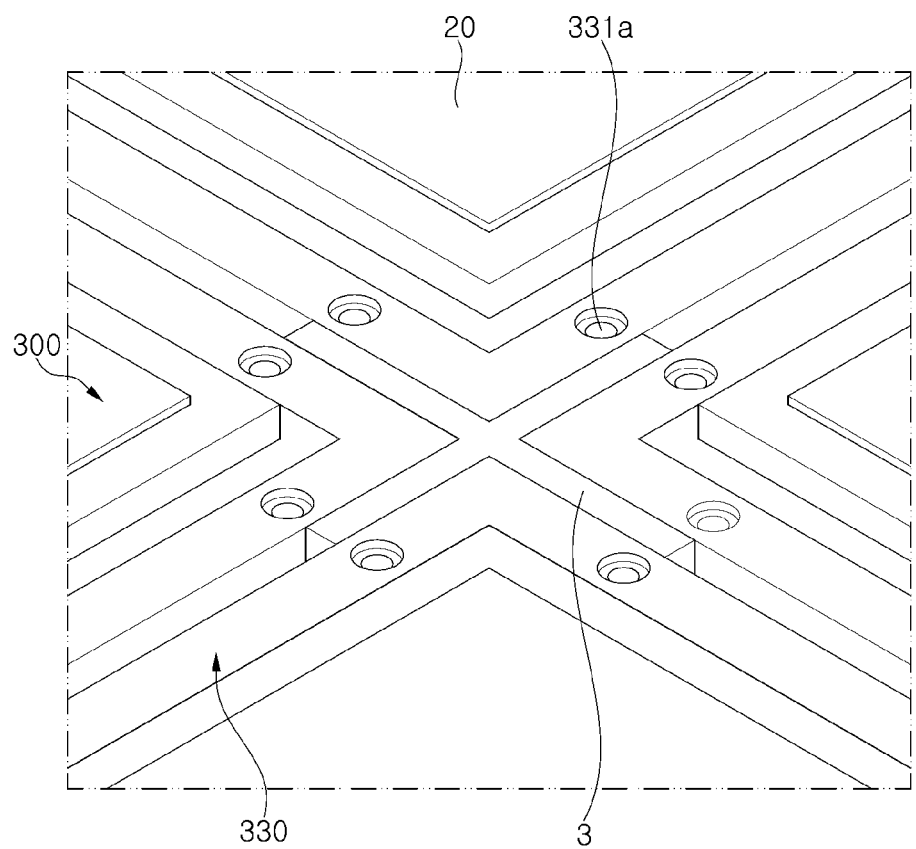

【FIG. 23】
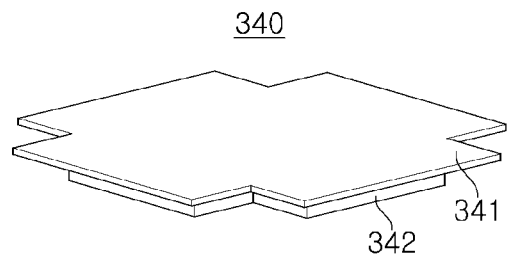
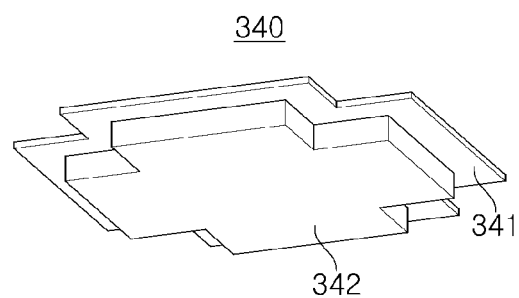
【FIG. 24】
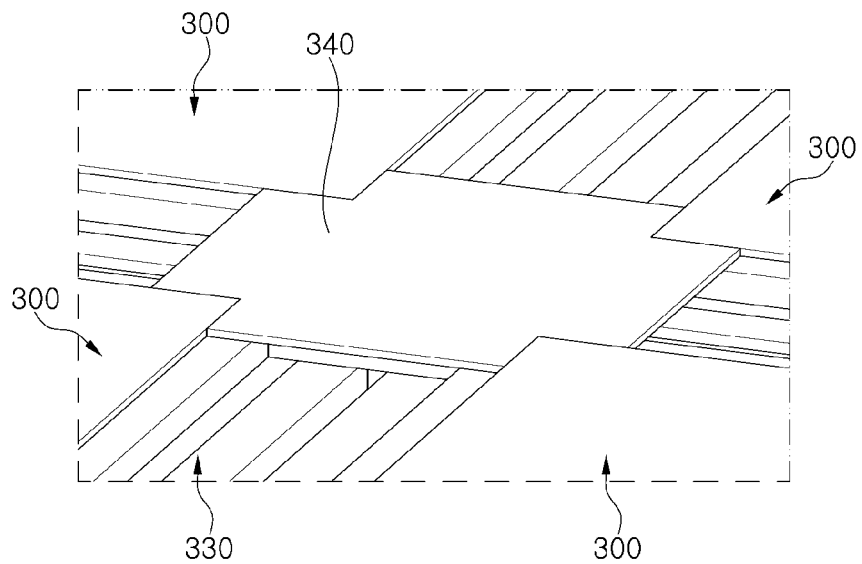

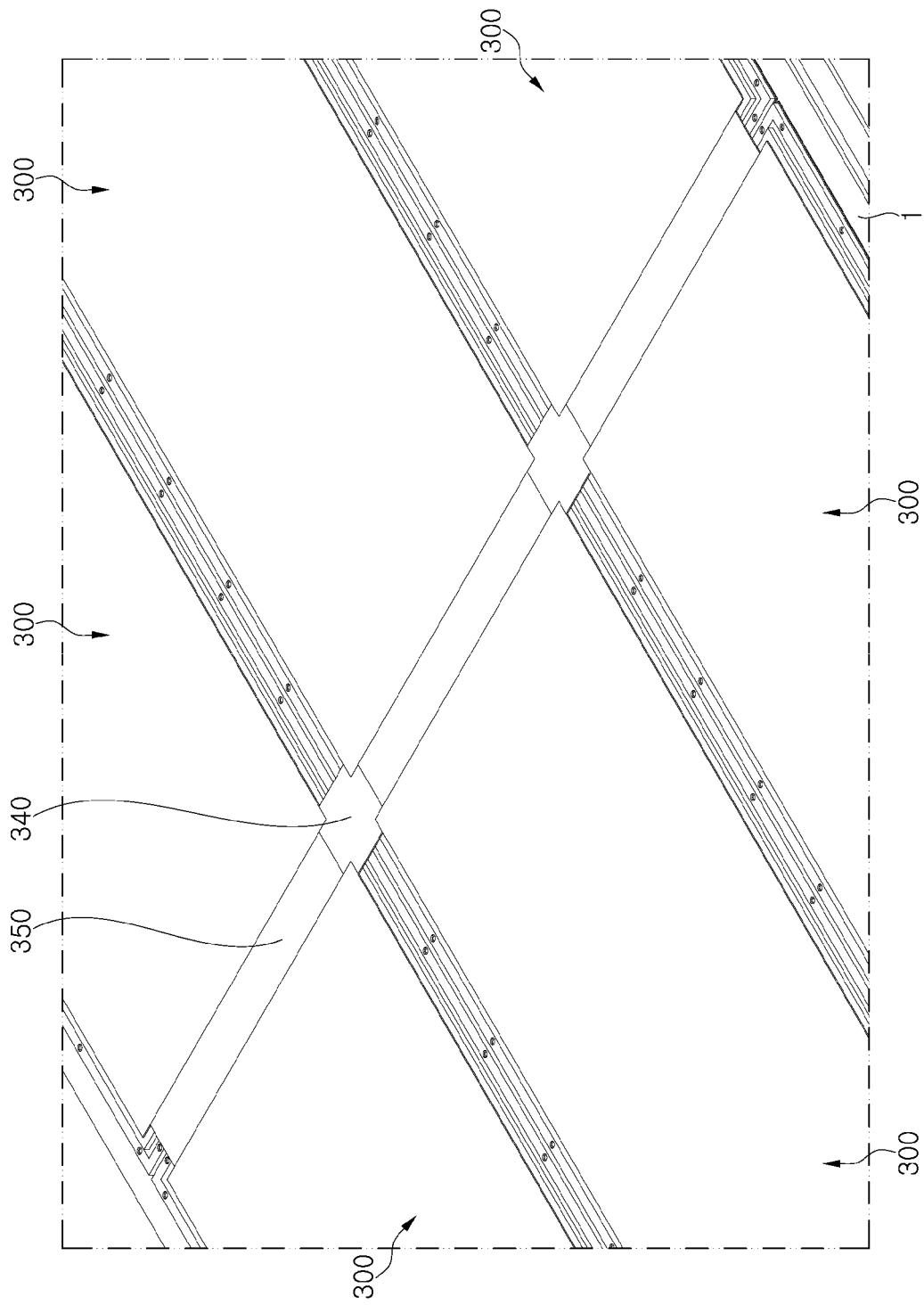
[FIG. 25]

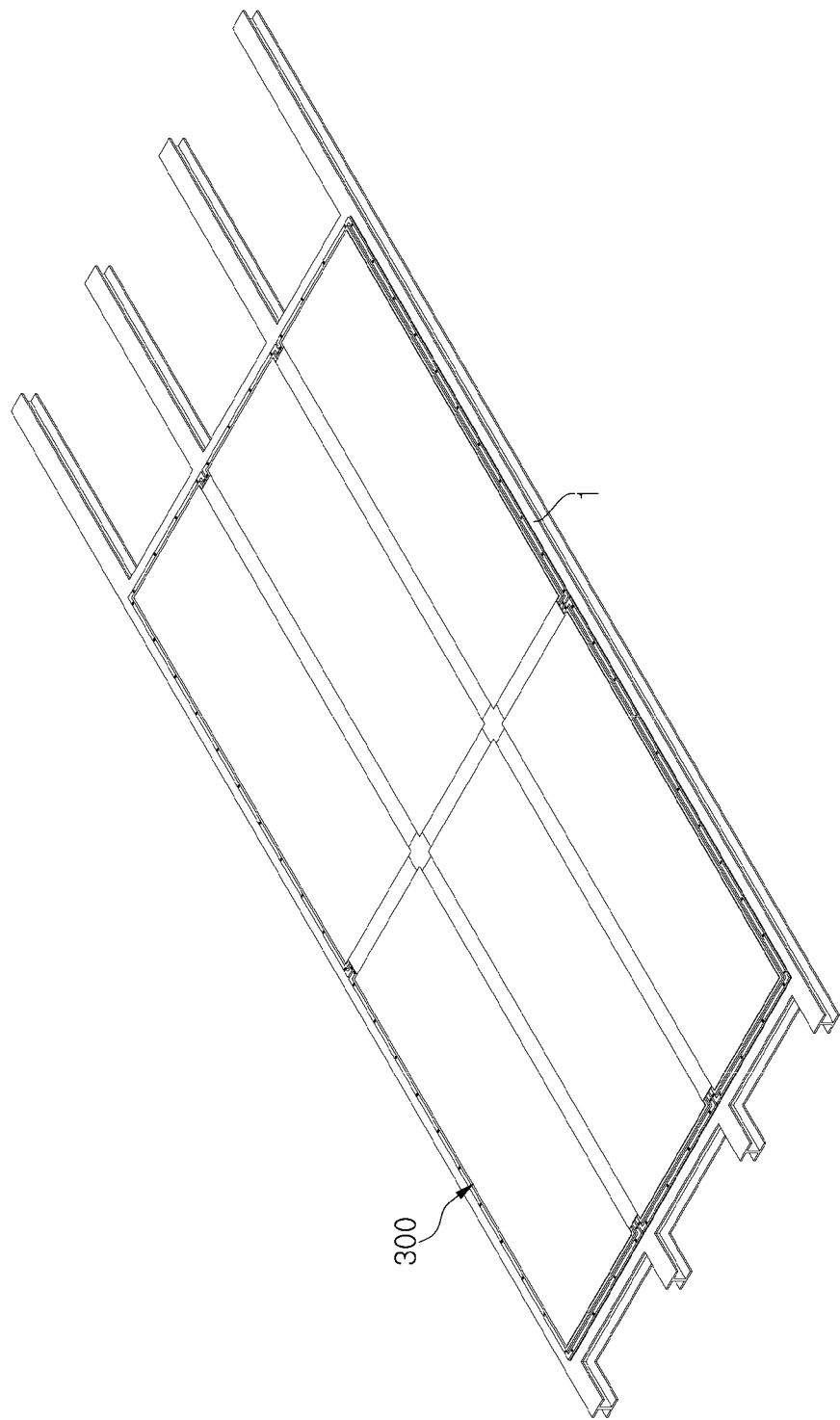
[FIG. 26]

[FIG. 27A]
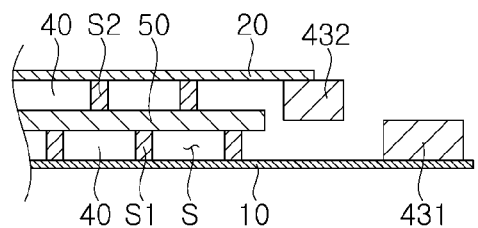
[FIG. 27B]
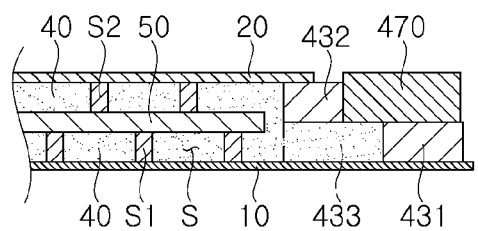
[FIG. 27C]
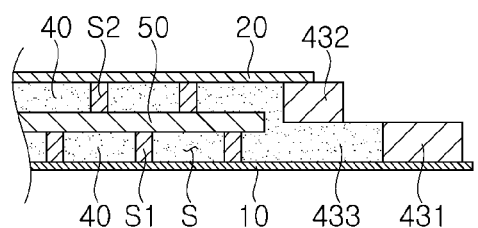

[FIG. 28A]
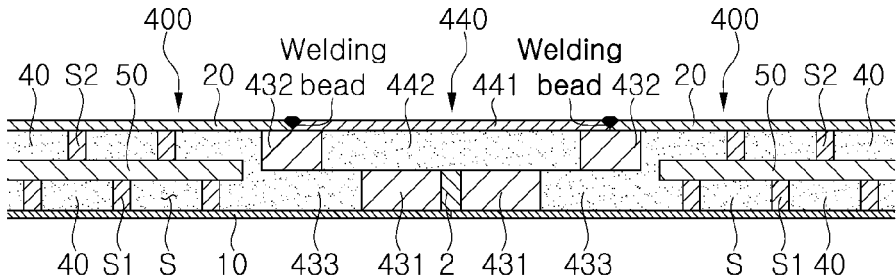
[FIG. 28B]
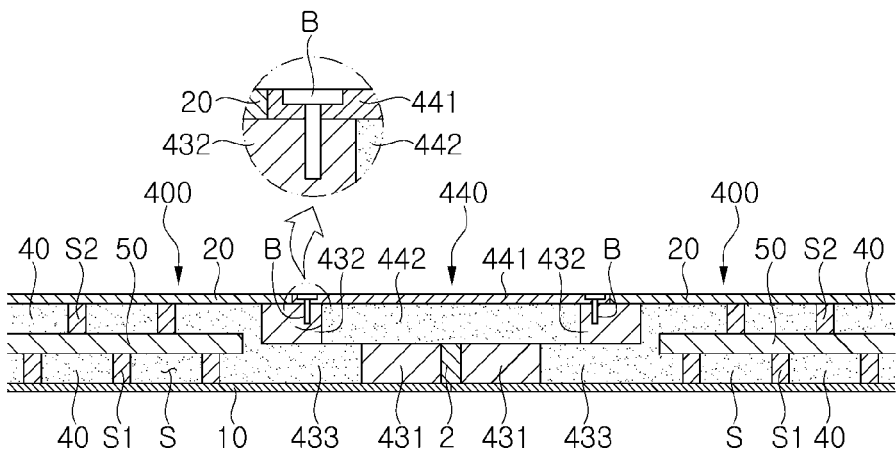
[FIG. 29]
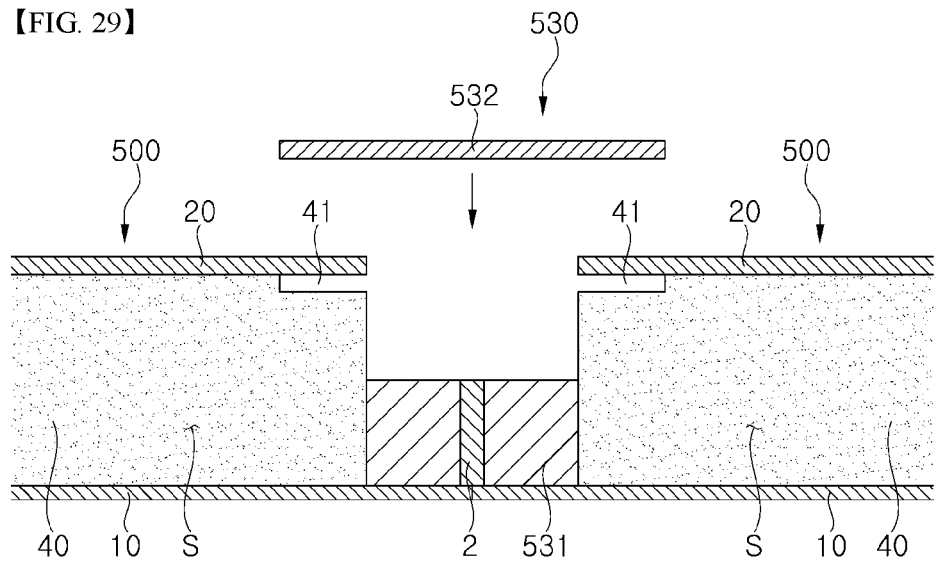

[FIG. 30]
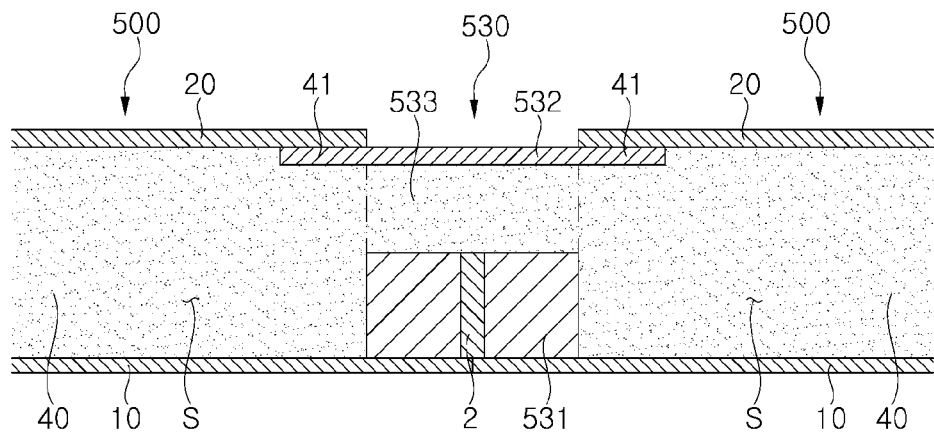
[FIG. 31]
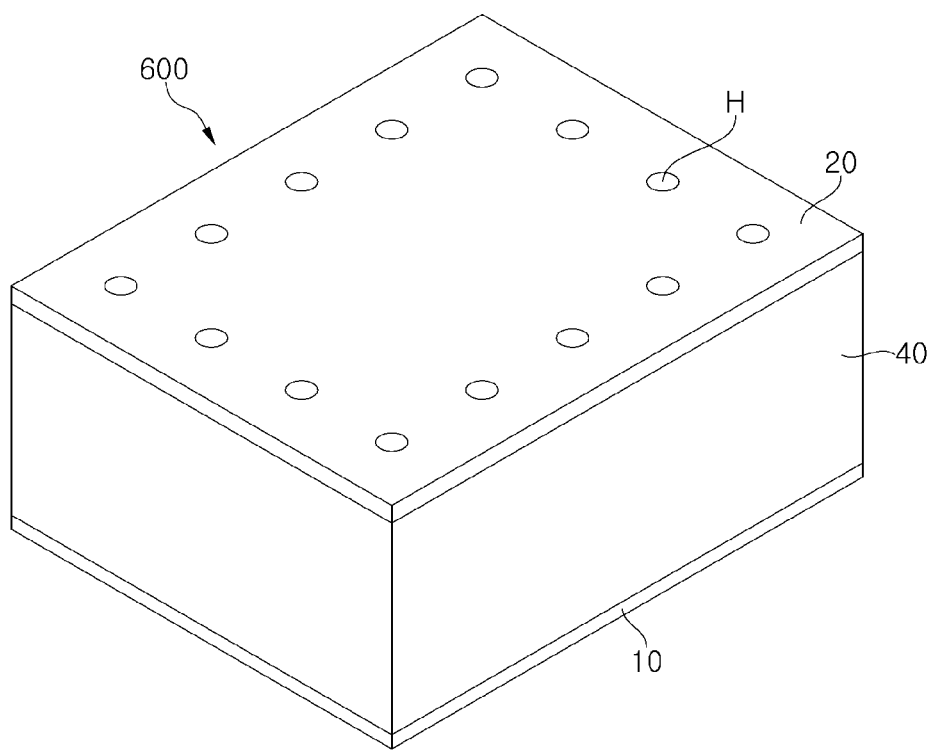

[FIG. 32]
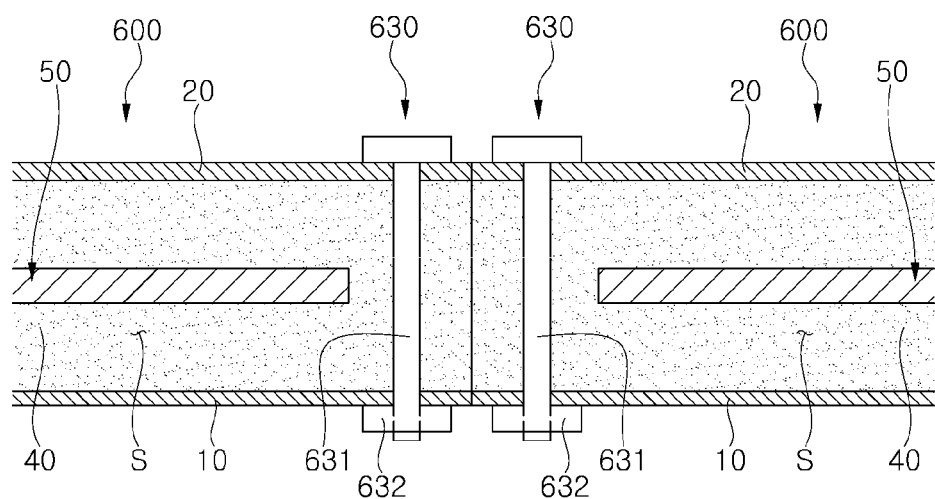

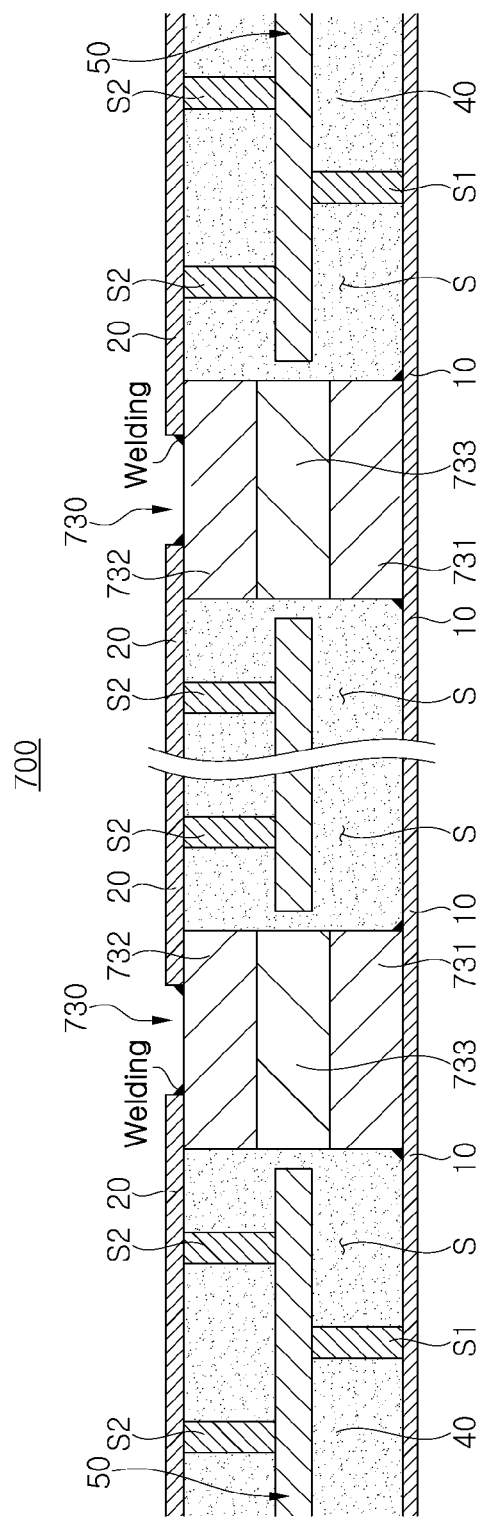
[FIG. 33]

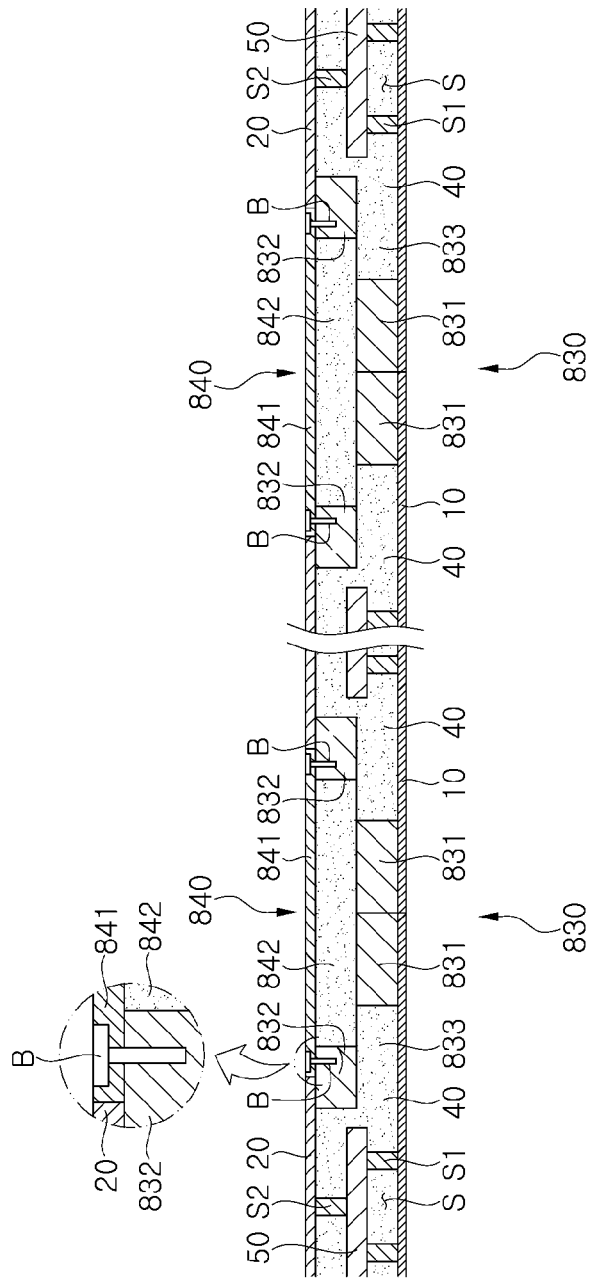
[FIG. 34]

[FIG. 35]
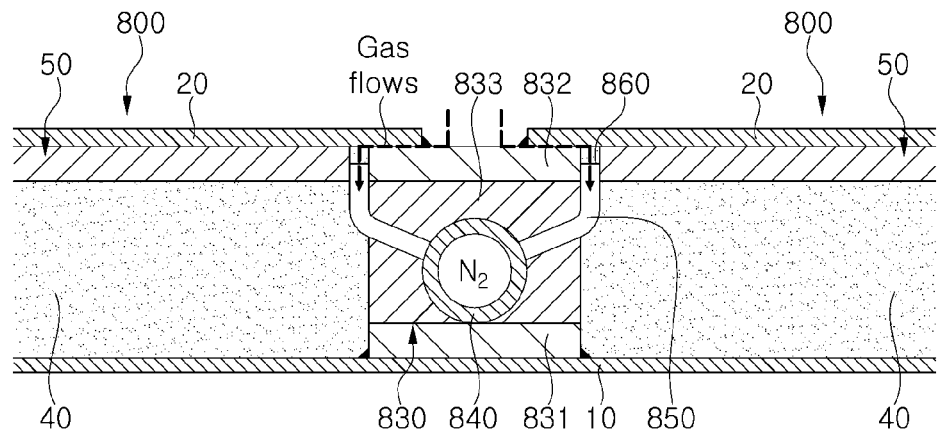
[FIG. 36]
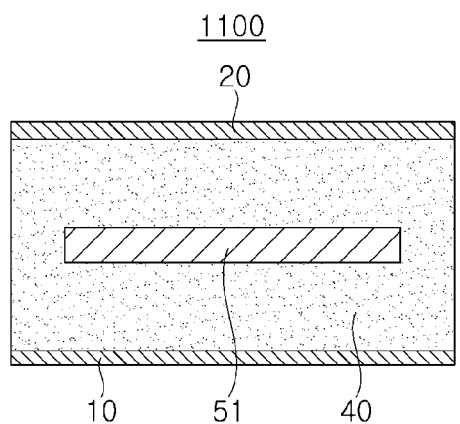
[FIG. 37]
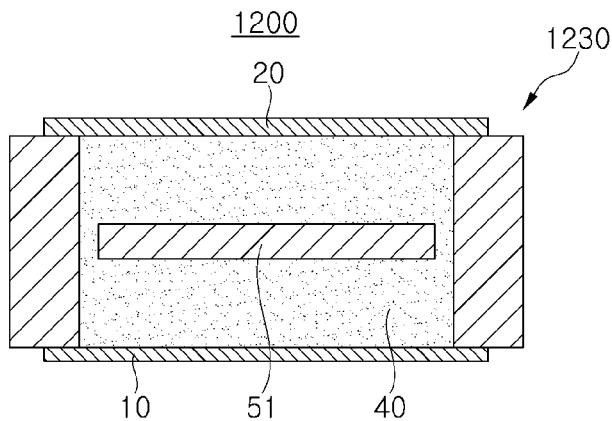

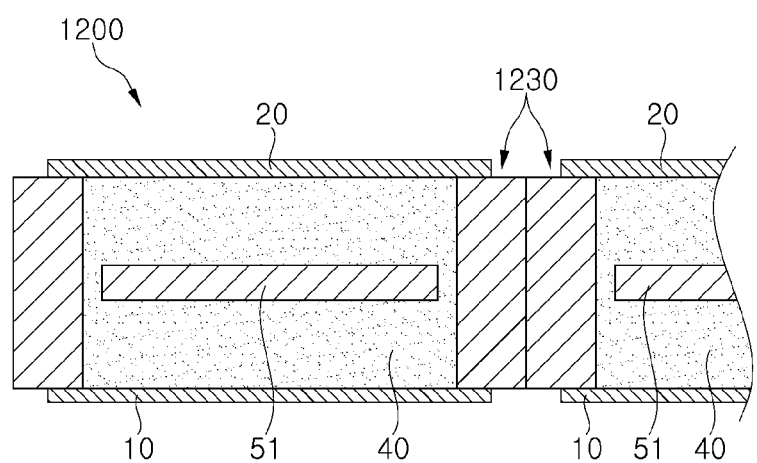
[FIG. 38]

HEAT-INSULATING STRUCTURAL MATERIAL, AND LOW TEMPERATURE AND ULTRA-LOW TEMPERATURE LIQUEFIED GAS CARRIER USING THE SAME

CROSS-REFERENCE TO RELATED APPLICATION

This application is a national stage application, filed under 35 U.S.C. § 371, of International Patent Application No. PCT/KR2018/010365, filed on Sep. 5, 2018, which claims the priority of Korean application No. 10-2017-0116617 filed Sep. 12, 2017 and Korean application No. 10-2018-0057690 filed May 21, 2018, the contents of which are incorporated by reference.

TECHNICAL FIELD

The present invention relates to heat-insulating structural material having thermal insulation performance and structural material performance, and a low temperature and cryogenic liquefied gas carrier including the same, and more particularly, to a heat-insulating structural material, which can minimize or prevent thermal bridging through structural improvement of a connection portion, can improve thermal insulation performance through an intermediate layer including a vacuum insulator disposed inside a core layer of the heat-insulating structural, can improve structural stiffness by forming the core layer using a non-foaming polymer material having good structural performance, and can prevent gas passage through the vacuum insulator while improving fire resistance by forming the core layer to evenly surround the entire outer surface of the vacuum insulator, and a low temperature and cryogenic liquefied gas carrier including the same.

BACKGROUND ART

In general, composite laminate structural materials are produced by injecting an elastomer into a sealed metal box and are used as substitutes for concrete structural materials for construction and steel structural materials for shipbuilding.

Korean Patent No. 10-0742033 discloses a composite laminate structural material. However, this composite laminate structural material disclosed in the patent has the following problems:

First, the composite laminate structural material is a structural material designed mainly to withstand heavy weight and impact and thus has a limitation as a thermal insulator. That is, since the composite laminate structural material has a structure in which a first metal layer and a second metal layer constituting a metal box are bonded to an intermediate layer of a polymer (elastomer) having relatively high density, thermal bridging is likely to occur on the entire surface of each of the first and second metal layers.

Here, thermal bridging refers to a phenomenon in which an interrupted portion of a heat-insulating structural material, that is, an end of the structural material, has a lower low temperature than the other portions of the structural material and a lot of heat flows through the end of the structural material, causing significant reduction in thermal insulation for cryogenic cargo, such as liquefied gas (LNG or LPG). For example, when a heat-insulating structural material includes a highly thermally conductive metal passing therethrough in the thickness direction, a considerable amount of heat flows through the metal.

In the composite laminate structural material, since the first metal layer and the second metal layer have very high thermal conductivity, the intermediate layer formed of the polymer (elastomer) is most responsible for thermal insulation.

However, elastomers commonly used in the art have a thermal conductivity (k-value) of about 0.17 W/m·K to about 0.18 W/m·K (at 20° C.), which is not even comparable with general insulators such as aerogels or vacuum heat insulators, and have much lower thermal insulation performance than organic or inorganic insulators (thermal conductivity: 0.030 W m·K to 0.045 W m·K) which are most commonly used in the art.

Even today, there is no heat-insulating structural material (or composite panel) that provides both thermal insulation and structural integrity, and most heat-insulating structural materials known in the art still have the problems described above and thus have a technical limitation in application to a cargo tank storing heavy and low temperature cargo (for example, liquefied gas).

For typical heat-insulating structural materials, a perimeter bar formed of a metallic material is used to maintain structural rigidity. However, high thermal conductivity of the metal can cause thermal bridging and thus significant reduction in thermal insulation performance.

In order to solve this problem, a panel-type heat-insulating structural material as shown in FIG. 1(a) can be considered. The panel-type heat-insulating structural material has a structure in which a perimeter bar 5 formed of a metallic material is disposed between a corresponding one of lower metal plates 3 and a corresponding one of upper metal plates 4, a polyurethane layer 7 is formed between a corresponding one of the lower metal plates 3 and a corresponding one of the upper metal plates 4, and an anti-thermal bridging member 6 is formed at an end of each of a pair of adjacent upper metal plates 4 to connect the pair of adjacent upper metal plates 4 to prevent thermal bridging.

Here, the term "panel-type" means that assembly work is accomplished by a method in which finished insulating structural materials are arranged adjacent to one another, followed by connecting the insulating structural materials to one another by welding or other fastening methods.

However, despite the presence of the anti-thermal bridging member 6, thermal bridging, which causes significant reduction in thermal insulation, can still be expected to occur due to concentration of heat at both ends of the anti-thermal bridging member 6 and at the end of the upper metal plate 4, as indicated by the arrows of FIG. 1B, and transfer of the heat through the perimeter bar 5, as indicated by the dotted arrows of FIG. 1B.

In addition, an overlay type heat-insulating structural material as shown in FIG. 1C can also be considered. The overlay type heat-insulating structural material is fabricated on the site and has a structure in which perimeter bars 5 and upper metal plates 4 are laminated on a single common lower metal plate 3. That is, each of the perimeter bars 5 is disposed at an end of a corresponding one of the upper metal plates 4 and on the lower metal plate 3, and a polymer layer 7 is formed between the lower metal plate 3 and each of the upper metal plates 4, wherein the perimeter bar 5 is formed of a metal.

However, in the overlay type heat-insulating structural material, thermal bridging, which causes significant reduction in thermal insulation, can be expected to occur due to heat flows transferred through the metal perimeter bar 5, as indicated by the dotted arrows.

The aforementioned techniques, generally used in the related art or considered by the present inventors, have the following problems:

1) Thermal Bridging Occurs.

The metal perimeter bar used to constitute a metal box (a space in which a polymer layer is formed) causes severe thermal bridging due to properties of a metal as a material therefor, and thus plays a major role in rapid outflow of cold air from a cryogenic tank or sharp increase in temperature of the opposite side in case of fire.

When general metal perimeter bars are used in the heat-insulating structural material, a thermal bridge zone, which is created by connection between the metal perimeter bars, occupies about 3% to 7% of the total area of the heat-insulating structural material. Assuming use of the most common steel, the thermal conductivity in the thermal bridge zone is typically about 80 to 100 times as high as that at the core of the heat-insulating structural material. Once heat generated on one side of the heat-insulating structural material is transferred to the other side, heat transfer is accelerated by the metal plate having high thermal conductivity. As a result, about 20% to 40% of the area of the other side exhibits poor thermal insulation.

For this reason, the non-foaming polymer-based structural material often needs to be coated on an outer surface thereof with a fireproof material or a fireproof paint.

2) A Vacuum Heat Insulator has Technical Limitations in Application to Heat-Insulating Structural Materials.

First, the vacuum heat insulator is very inadequate for use as a structural material. The vacuum heat insulator has an elastic modulus of about 50 MPa to about 80 MPa, which is about 3,000 times as low as that of steel. Accordingly, it is impossible to manufacture a flooring material for buildings or a cryogenic tank for ships using the vacuum heat insulator alone.

In addition, in terms of thermal insulation, the vacuum heat insulator has a drawback in that, when a coating of the vacuum heat insulator is damaged by external impact, thermal insulation performance of the vacuum heat insulator is significantly reduced due to intrusion of external air.

The coating of the vacuum heat insulator serves to effectively surround inner fillers in a vacuum chamber and thus is formed of a thin aluminum-based coating material or a composite coating material having similar performance thereto. Such a coating is very vulnerable to external impact or scratches. In addition, despite the presence of the outer metal coating, external air or moisture gradually permeates the vacuum heat insulator over time, causing gradual deterioration in thermal insulation performance.

3) A Foaming Polymer (for Example, Polyurethane) is Very Vulnerable to Fire.

Existing large LPG or LNG carriers use a foaming polymer as an insulator to maintain a cargo tank at a very low temperature.

Use of a dense non-foaming polymer can cause significant reduction in thermal insulation performance. In order to solve this problem, a foaming material is mixed with a polymer to form an expanded structure inside a core layer of the polymer. The problem is that such a foaming material used in LPG or LNG carriers is very vulnerable to fire and emits very harmful gases when burned. There have been many cases of fire hazards involved with use of foaming polymers in onshore freezing/cold storage warehouses, as well as in ships. Although welding sparks during construction can cause a problem in the foaming polymer, the foaming polymer also has a problem of high vulnerability to fire even after completion of construction.

4) A Non-Foaming Polymer-Based Structural Material is Difficult to Use as a Thermal Insulator for a Cryogenic Tank of LPG or LNG Carriers Due to Poor Thermal Insulation Performance.

For a non-foaming polymer-based structural material, a hermetically sealed metal box is used to enclose a non-foaming polymer and the non-foaming polymer itself is non-toxic and has high flame retardancy. Thus, the non-foaming polymer-based structural material has a relatively great advantage in case of fire, as compared with the foaming polymer-based structural material.

That is, even when the non-foaming polymer injected into the sealed metal box is exposed to a temperature of about 300° C. or more for several tens of minutes, only a part of the surface of the non-foaming polymer is carbonized and burned due to its airtight characteristics and its very dense density (generally having a specific gravity of 1.0 or more) as compared with that of the foaming polymer. However, thermal insulation performance of the non-foaming polymer-based structural material is very low, equivalent to only $\frac{1}{5}$ to $\frac{1}{7}$ that of a general EPS insulator. Thus, the non-foaming polymer-based structural material cannot meet thermal insulation requirements for a cryogenic tank for LPG or LNG carriers and is thus difficult to use in such a cryogenic tank.

5) The Non-Foaming Polymer-Based Structural Material is Difficult to Use in a Structure Subjected to Fire-Resistance Standards Due to Low Thermal Insulation Performance.

Despite better fire resistance than the foaming polymer-based structural material, due to low thermal insulation performance, the non-foaming polymer-based structural material has a limitation in maintaining a opposite side thereof not exposed to fire, at a temperature of 110° C. to 180° C. for a long time, which is a general fire-resistance standard.

Actually, when used as a flooring material for buildings, which needs to maintain fire resistance for at least 2 hours, a composite laminate structural material using the non-foaming polymer necessarily requires a coating of a fireproof paint or an insulator and thus is difficult to use in a structure subjected to fire resistance standards.

6) Typically, the Vacuum Heat Insulator is Inadequate for Use as a Fireproof Insulator.

Since a core material (for example, fumed silica) constituting the vacuum heat insulator has similar properties to sand grains, the vacuum heat insulator is considered as an incombustible material, which is not burnt at high temperatures, and can fully function as a thermal insulator so long as internal vacuum thereof is maintained to a certain degree even at high temperatures. However, as described above, the vacuum heat insulator includes a thin aluminum-based coating material or a composite coating material having similar performance thereto to maintain internal vacuum. Such a composite coating material is easily deformed even with a slight increase in temperature, causing cracking or breakage of a composite coating and thus sharp decrease in internal vacuum.

For this reason, the vacuum heat insulator is inadequate for use as a fireproof insulator, despite having far superior thermal insulation performance to other insulators. Actually, the maximum allowable temperature of the vacuum heat insulator merely ranges from about 100° C. to about 150° C., making it impossible to use the vacuum heat insulator as a fireproof insulator.

DISCLOSURE

Technical Problem

The present invention has been conceived to solve such problems in the art, and is aimed at providing a heat-insulating structural material that can be generally applied to various fields, for example, heat insulating systems of low temperature cargo tanks or buildings, which require thermal insulation performance, structural performance, and fire resistance, firstly, by minimizing or preventing thermal bridging through structural improvement of a connecting portion of the heat-insulating structural material, secondly, by improving thermal insulation performance through an intermediate layer including a vacuum insulator disposed inside a core layer of the heat-insulating structural material, thirdly, by improving structural stiffness and preventing gas passage through the vacuum insulator by forming the core layer using a non-foaming polymer material having good structural performance to evenly surround the entirety outer surface of the vacuum insulator, and fourthly, by substantially improving self-fireproof performance without using a separate fireproof paint or insulator.

Technical Solution

Embodiments of the present invention provide a heat-insulating structural material.

In accordance with one aspect of the present invention, a heat-insulating structural material includes: a lower plate; an upper plate disposed above the lower plate to be separated a constant distance from the lower plate; an intermediate layer optionally disposed between the lower plate and the upper plate and including a heat insulator; a connecting portion provided to a distal end of each of the lower plate and the upper plate to prevent thermal bridging while securing structural fastening and composed of a combination of a metal layer and a non-metal layer; and a core layer disposed in a space defined by the lower plate, the upper plate, the optional intermediate layer, and the connecting portions.

That is, according to the present invention, a heat insulation effect of the heat-insulating structural material is improved by preventing the upper plate and the lower plate from being directly connected to each other via a metal member having high thermal conductivity. Preferably, at the connecting portion between the heat-insulating structural materials, the upper plate and the lower plate are prevented from being directly connected to each other via the metal member having high thermal conductivity.

The heat insulator may include at least one selected from the group of a vacuum heat insulator, an aerogel heat insulator, organic and inorganic slim heat insulators, and an amorphous heat insulator.

In addition, the connecting portion may have a laminate structure including:

a lower connecting portion secured to the lower plate and formed of a metallic material; an upper connecting portion secured to the upper plate and formed of a metallic material; and a non-foaming polymer interposed as an intermediate connecting portion between the lower connecting portion and the upper connecting portion.

Further, the connecting portion may have a step structure including:

a lower connecting portion secured to the lower plate and formed of a metallic material; an upper connecting portion secured to the upper plate to be stepped with respect to the lower connecting portion and formed of a metallic material; and a non-foaming polymer interposed as an intermediate connecting portion between the lower connecting portion and the upper connecting portion.

Further, the connecting portion may have a filling step structure including:

a lower connecting portion secured to the lower plate and formed of a metallic material; an upper connecting portion secured to the upper plate to be stepped with respect to the lower connecting portion and formed of a metallic material; and a non-foaming polymer interposed as an intermediate connecting portion between the lower connecting portion and the upper connecting portion, wherein the non-foaming polymer is integrated with the core layer in the course of filling and curing the core layer after a gap between the lower connecting portion and the upper connecting portion is blocked using a temporary blocking member.

Further, the connecting portion may connect adjacent heat-insulating structural materials to each other and have a filling finished structure including:

a lower connecting portion secured to the lower plate and formed of a metallic material; an upper connecting portion secured to the upper plate and formed of a metallic material; and a non-foaming polymer interposed as an intermediate connecting portion between the lower connecting portion and the upper connecting portion, wherein the upper connecting portion is detachably coupled to the upper plate; and the non-foaming polymer is integrated with the core layer by injecting a liquid non-foaming polymer into a space between the upper connecting portion and the lower connecting portion, followed by curing the liquid non-foaming polymer.

Further, the connecting portion may have a bolt fastening structure in which:

each of the lower plate and the upper plate includes multiple fastening holes disposed along a periphery thereof and vertically penetrating the lower plate or the upper plate such that the connecting portion is coupled to the fastening holes to couple the heat-insulating structural material to a sub-structure.

A non-metallic layer constituting the connecting portion may be provided with a heat insulator and a connector to improve thermal insulation and structural performance.

The heat-insulating structural material may further include an intermediate layer in a space (a space between the lower plate and the upper plate), wherein the intermediate layer may have at least one structure selected from the group of a structure in which the intermediate layer is disposed on a lower surface of the upper plate, a structure in which the intermediate layer is disposed inside the core layer, and a structure in which the intermediate layer is disposed on an upper surface of the lower plate.

The intermediate layer may include a vacuum heat insulator and, in the structure in which the intermediate layer is disposed on the lower surface of the upper plate, the intermediate layer is slippable with respect to the upper plate.

A connector may be secured between the upper plate and the lower plate.

The core layer may be air-tightly attached to an inner surface of the space by filling the space with a liquid non-foaming polymer, followed by curing the non-foaming polymer to protect the vacuum heat insulator from external impact while maintaining structural stiffness of the vacuum heat insulator.

The non-foaming polymer may include a non-foaming polyurethane, preferably a polymer having an elastic modulus of 200 MPa or more.

The intermediate layer may essentially consist of the vacuum heat insulator and may further include at least one selected from the group of a vacuum heat insulator surface-protection material, a reinforcing heat insulator, and a slip material.

The vacuum heat insulator may be interposed between the core layer and the upper plate to have thermal insulation performance;

the vacuum heat insulator surface-protection material may be interposed between the vacuum heat insulator and the upper plate to prevent damage to a coating of the vacuum heat insulator, and the slip material may allow slipping of the intermediate layer with respect to the upper plate.

The core layer may be very closely bonded (attached) to an inner surface of a box space defined by the lower plate, the upper plate and the connecting portion. The core layer may be air-tightly bonded to the vacuum heat insulator to surround and protect the vacuum heat insulator.

The core layer may have a weight reduction member 80 therein.

The heat-insulating structural material may have at least one structure of a panel type structure in which one upper plate is disposed on one lower plate to connect adjacent heat-insulating structural materials to each other and an overlap type structure in which a number of upper plates is disposed on one lower plate in a lattice shape.

In the overlay type structure, the connecting portion may include: a lower connecting portion secured to the lower plate and formed of a metallic material; an upper connecting portion secured to the upper plate and formed of a metallic material; and a non-foaming polymer interposed between the lower connecting portion and the upper connecting portion.

In general, for an LPG or LNP membrane cargo tank to which a foaming polymer is applied, heat insulating boxes each having a thickness of 200 mm to 500 mm are manufactured in a factory and attached to the cargo tank and a metal plate or a coating of a synthetic material having good low temperature properties is attached to the heat insulating boxes. Such a membrane structure requires a design tolerance of 10 mm to 20 mm between the heat insulating boxes. However, since the heat insulating boxes suffer from severe dimensional variation over the tolerance in an aging period in which the heat insulating boxes are repeatedly subjected to shrinkage/expansion, a gap between the heat insulating boxes is set to a size greater than or equal to the design tolerance.

That is, a substantial gap is inevitably present between the heat insulating boxes. As a result, significant thermal bridging can occur through the gap and a substantial amount of gas can be accumulated in the gap upon gas leakage.

According to the present invention, an air-tight structure can be formed without such a gap and a low temperature and ultra-low temperature cargo tank employing such an air tight structure exhibits much better properties in terms of heat insulation and stability than a membrane type cargo tank.

Further, in fabrication of a heat insulating box using a foaming polymer, since plywood constituting the heat insulating box is bonded to the foaming polymer having a vulnerable structure, the plywood is often damaged due to sloshing impact. That is, this phenomenon is the same as the principle that the plywood can be pressed but is not easily broken upon application of impact to the plywood placed on a rigid stone plate, whereas the plywood can be broken upon application of impact to the plywood placed on a bed.

Although a high-density foaming polymer having a density of about 60 kg/m$^3$ to about 400 kg/m$^3$ is used to prevent this problem, the heat insulating box is still vulnerable to sloshing impact due to gas cells therein.

According to the present invention, since the non-foaming polymer applied to the core layer is a high density material generally having a density of 900 kg/m$^3$ or more, the non-foaming polymer can effectively protect the intermediate layer including the heat insulator disposed on the core layer from damage due to sloshing.

In accordance with another aspect of the present invention, a heat-insulating structural material may include: a metal upper plate; a metal lower plate separated a predetermined distance from the metal upper plate to define a space therebetween; a vacuum heat insulator inserted into the space between the metal upper plate and the metal lower plate; and a non-foaming resin surrounding the entirety of the vacuum heat insulator and closely bonded to the metal upper plate and the metal lower plate.

Advantageous Effects

As described above, the present invention has the following effects:

1) The heat-insulating structural material has a light-weight and very strong structure. That is, the heat-insulating structural material has a function as a composite laminate structural material constituted by the upper and lower metal plates and the core layer.

The upper and lower metal plates can withstand huge in-plane stress applied to the entire structure; the entire structure can perform complex single behavior due to the role of the non-foaming polymer constituting the core layer inside the heat-insulating structural material; and the number of cross-sections increases due to a separation structure corresponding to the thickness of the core layer, thereby providing a very effective structural material. In addition, since the non-foaming polymer is invulnerable to impact, the heat-insulating structural material according to the present invention can effectively absorb external impact.

2) A non-metallic layer, for example, a non-foaming polymer (intermediate connecting portion), is disposed between the upper and lower connecting portions to effectively prevent thermal bridging and is integrated with the core layer formed of the non-foaming polymer in the course of filling and curing a liquid non-foaming polymer to form the core layer, thereby securing sufficient structural stiffness and thermal insulation performance through improved air-tightness and adhesion of the heat-insulating structural material.

In particular, the intermediate layer including the vacuum heat insulator may be formed inside the core layer, which is air-tightly or liquid-tightly bonded to the inner surface of the box space and evenly surrounds the vacuum heat insulator, thereby further improving structural stiffness of the heat-insulating structural material.

In the heat-insulating structural material according to the present invention, an upper structure is an air-tight structure covered by a metallic material capable of preventing leakage of a cryogenic liquefied gas and exhibits excellent structural performance through an air-tight bonding structure. With such an air-tight bonding structure, the heat-insulating structural material has good structural performance. In addition, the core layer formed of the non-foaming polymer, particularly, a non-foaming polyurethane, has a density of about 900 kg/m$^3$ and an elastic modulus of greater than 200 MPa, and protects the vacuum heat insulator through the air-tight bonding structure by surrounding the vacuum heat insulator to prevent gas passage through the vacuum heat insulator, thereby enabling maintenance of thermal insulation performance after use for a long period of time.

Furthermore, the heat insulator is disposed inside the non-metallic layer (intermediate connecting portion), thereby more effectively preventing thermal bridging.

In particular, since the non-foaming polymer used as the material for the core layer allows substantially no air permeation and has higher bonding strength and tensile strength (10 to 100 times) than a typical foaming polyurethane containing bubbles therein, mechanical strength and bonding strength of the non-foaming polymer with respect to the upper and lower metal plates and the intermediate layer (for example, the vacuum heat insulator) are significantly improved. When the intermediate layer includes the vacuum heat insulator, the heat-insulating structural material maintains air-tightness, thereby securing a semi-permanent vacuum of the vacuum heat insulator.

3) A connection structure of the connector of the heat-insulating structural material according to the present invention can distribute stress applied to a heat-insulating structural material for an ultra-low temperature storage tank under a very high load and large structural movement while substantially improving structural performance of the heat-insulating structural material.

That is, the connection structure of the connector distributes stress applied to the heat-insulating structural material for the ultra-low temperature storage tank, and allows all of the metal box, the core layer and the intermediate layer to behave in the same manner, thereby enabling significant improvement in structural performance and effectively preventing delamination without suffering from local buckling. Typically, the foaming polymer has a bonding strength of several kilopascals (kPa) due to bubbles therein, whereas the non-foaming polymer has a bonding strength of several megapascals, thereby securing remarkable effects in prevention of delamination even with a connector having a small area.

4) In the heat-insulating structural material according to the present invention, the connector may be disposed before injection of the liquid non-foaming polymer. Thus, as the liquid non-foaming polymer of the core layer is cured, the non-foaming polymer is bonded over the entire outer surface of the connector, whereby the connector can be air-tightly bonded to the core layer in a wedge shape and can firmly hold the core layer through increase in bonding area by two or three times of the area thereof in plan view, thereby remarkably improving durability and adhesion therebetween.

5) An LPG carrier cargo tank employing the heat-insulating structural material according to the present invention is not an independent tank and is provided to the carrier through direct construction on the hull, thereby significantly improving space efficiency through removal of a large dead space between a typical independent tank and the hull.

According to this embodiment, the dead space is removed and the thicknesses of the typical foaming polymer (thickness: about 120 mm) and the heat insulation protective material are decreased, thereby securing an additional huge tank space.

When an existing ship form is maintained, the volume of the cargo tank is increased by about 20% to about 25%, and, when an existing cargo tank size (DWT 84K) is maintained, the overall size (width, length, height, and the like) of the hull can be significantly reduced, thereby providing a reduction of 10% to 20% in fuel consumption through a reduction of about 5% to 10% in weight of the ship and reduction in coefficient of ship form.

6) The heat-insulating structural material according to the present invention can fundamentally prevent danger of fire in manufacture of an LPG or LNG carrier cargo tank employing the same.

The non-foaming polymer has better properties in terms of fire resistance and fire prevention than a foaming polymer material. In particular, the non-foaming polymer is sealed in a box space (defined by the upper and lower plates and the connecting portion) and is thus completely prevented from being directly exposed to fire.

7) The heat-insulating structural material according to the present invention exhibits very good fireproof performance. That is, the heat-insulating structural material according to the present invention has substantial fire resistance without a separate fireproof paint or heat insulator.

The non-foaming polymer injected into a closed space defined by the upper and lower metal plates has an air-tight structure to allow local carbonization on the surface thereof even after exposure to high temperature for a long period of time. However, since the non-foaming polymer has high thermal conductivity, it is difficult to maintain an opposite side to the non-foaming polymer at a temperature of about 110° C. to 180° C., which is a typical fireproof reference, without a separate fireproof paint or heat insulator.

According to the present invention, even when a coating of the vacuum heat insulator is deformed or damaged due to high temperature, the core layer of the non-foaming polymer air-tightly protects the vacuum heat insulator, thereby maintaining thermal insulation performance of the vacuum heat insulator.

Accordingly, since the opposite side to the non-foaming polymer satisfies the fireproof reference for a substantial period of time, the heat-insulating structural material according to the present invention has substantial fire resistance without a separate fireproof paint or heat insulator.

8) The heat-insulating structural material according to the present invention is very useful in terms of reduction in vibration and noise. Since the core layer is composed of a more flexible material than metal or concreate materials, the heat-insulating structural material has substantial damping effects.

In addition, the vacuum structure inside the vacuum heat insulator provides excellent effects in reduction of vibration and noise.

According to Items 7) and 8), when applied to a residence zone of ships or to the bottom of walls of a building, the heat-insulation structural material according to the present invention has excellent effects in terms of construction, space utility and residence quality.

9) The heat-insulating structural material according to the present invention enables huge reduction in labor and manufacturing costs through simplification of a cargo tank structure of an LNG or LPG carrier manufactured using the same.

A typical independent tank insertion type requires substantial structural construction for an independent tank and for a hull supporting the independent tank, whereas the present invention employs one hull structure through direct construction of the heat-insulating structural material to a side shell instead of installing an inner wall on the side shell, thereby enabling substantial reduction in manufacturing costs.

10) In manufacture of a cargo tank for an LPG carrier using the heat-insulating structural material according to the present invention, the heat-insulating structural material can reduce use of a special low temperature iron plate, thereby enabling substantial reduction in manufacturing costs.

Since an LPG tank is generally maintained at a temperature of −50° C. to 55° C., it is necessary to manufacture the entirety of the independent tank using a special low temperature iron plate that is more expensive than general steel plates.

According to the present invention, the upper plate disposed to contact liquefied gas is manufactured using the special low temperature steel, whereas the lower plate disposed not to contact the liquefied gas can be manufactured using a general iron plate, thereby reducing use of expensive special low temperature steel to about half that of a conventional independent tank. In addition, as compared with the conventional independent tank using iron plates having a thickness of 12T, the cargo tank of the LNG carrier according to the present invention uses a special low temperature iron plate having a thickness of 6T and a general iron plate having a thickness of 6T, thereby enabling substantial reduction in manufacturing costs.

11) The heat-insulating structural material according to the present invention can reduce overall duration in manufacture of an LNG or LPG carrier cargo tank.

The conventional independent tank insertion type requires complicated processes performed through much labor input and consumes a long production period due to many difficult tasks in terms of transportation and mounting. On the contrary, the present invention enables innovative enhancement of the construction method, thereby enabling remarkable reduction in overall production time.

12) In the heat-insulating structural material according to the present invention, a vacuum heat insulator is basically disposed between the core layer and the upper plate directly contacting a cryogenic liquefied gas and formed of metal, and a vacuum heat insulator surface-protection material, a reinforcing heat insulator and a slip material are additionally disposed on the vacuum heat insulator to maintain an internal temperature of the heat-insulating structural material at an allowable temperature of the core layer (about −30° C. to −70° C.) or more by blocking ultra-low temperature, thereby effectively preventing ultra-low temperature brittle fracture.

13) In the heat-insulating structural material according to the present invention, an intermediate layer essentially consisting of the vacuum heat insulator is interposed between the core layer formed of a non-foaming polymer and the upper plate directly contacting a cryogenic liquefied gas and formed of metal, and a slip material is additionally disposed on the intermediate layer to induce a slip phenomenon between the upper plate and the intermediate layer, thereby effectively preventing thermal deformation and damage to a welded portion by substantially reducing thermal stress caused by difference in coefficient of thermal expansion between the upper plate and the core layer or by effectively blocking the thermal expansion from transferring into the heat-insulating structural material.

DESCRIPTION OF DRAWINGS

FIG. 1A is a sectional view of a typical panel type composite laminate structural material FIG. 1B is a sectional view illustrating a thermal bridging phenomenon of the composite laminate structural material shown in FIG. 1A.

FIG. 1C is a sectional view of a typical overlay type composite laminate structural material.

FIG. 2 is a perspective view of a heat-insulating structural material according to a first embodiment of the present invention.

FIG. 3A is a longitudinal sectional view of the heat-insulating structural material shown in FIG. 2, illustrating a non-metal layer interposed in the same shape as a lower connecting portion and a upper connecting portion.

FIG. 3B is a longitudinal sectional view of the heat-insulating structural material shown in FIG. 2, illustrating a non-metal layer interposed in a T-shape.

FIG. 4 is a longitudinal sectional view of a heat-insulating structural material according to a second embodiment of the present invention FIG. 5 to FIG. 7 are longitudinal sectional views illustrating a process of forming an intermediate layer in the heat-insulating structural material according to the first embodiment of the present invention.

FIG. 8 to FIG. 10 are longitudinal sectional views illustrating a process of additionally forming a vacuum heat insulator surface-protection material, a slip material, and a reinforcing heat insulator on a vacuum heat insulator of the intermediate layer essentially consisting of the vacuum heat insulator.

FIG. 11A is a sectional view of a connector disposed between an upper plate and a lower plate, illustrating that upper end of the connector is secured to a upper plate and lower end of the connector is secured to a core layer.

FIG. 11B is a sectional view of a connector disposed between an upper plate and a lower plate, illustrating that both ends of the connector are secured to the core layer.

FIG. 12 is a sectional view of a core layer having a weight reduction member 80 therein.

FIG. 13 is a perspective view of a heat-insulating structural material according to a third embodiment of the present invention.

FIG. 14 is a longitudinal sectional view of the heat-insulating structural material shown in FIG. 13.

FIG. 15 to FIG. 26 are sectional views of a heat-insulating structural material having a connecting portion of a filling step structure.

FIG. 27A is a longitudinal sectional view of a heat-insulating structural material according to a fourth embodiment of the present invention, illustrating a first step for forming the heat-insulating structural material 400 to which the connecting portion of the filling step structure is applied.

FIG. 27B is a longitudinal sectional view of a heat-insulating structural material according to a fourth embodiment of the present invention, illustrating a second step for forming the heat-insulating structural material 400 to which the connecting portion of the filling step structure is applied.

FIG. 27C is a longitudinal sectional view of a heat-insulating structural material according to a fourth embodiment of the present invention, illustrating a third step for forming the heat-insulating structural material 400 to which the connecting portion of the filling step structure is applied.

FIG. 28A is a longitudinal sectional view of a heat-insulating structural material according to a fourth embodiment of the present invention, illustrating that a metal plate of the finishing member is welded to the upper connecting portion.

FIG. 28B is a longitudinal sectional view of a heat-insulating structural material according to a fourth embodiment of the present invention, illustrating that a metal plate of the finishing member is fastened to the upper connecting portion by a bolt.

FIG. 29 and FIG. 30 are longitudinal sectional views of a heat-insulating structural material according to a fifth embodiment of the present invention.

FIG. 31 is a perspective sectional view of a heat-insulating structural material according to a sixth embodiment of the present invention.

FIG. 32 is a longitudinal sectional view of the heat-insulating structural material according to the sixth embodiment of the present invention.

FIG. 33 is a longitudinal sectional view of a heat-insulating structural material according to a seventh embodiment of the present invention.

FIG. 34 is a longitudinal sectional view of a heat-insulating structural material according to an eighth embodiment of the present invention.

FIG. 35 is a longitudinal sectional view of a heat-insulating structural material according to a ninth embodiment of the present invention.

FIG. 36 is a longitudinal sectional view of a heat-insulating structural material according to a tenth embodiment of the present invention.

FIG. 37 is a longitudinal sectional view of a heat-insulating structural material according to an eleventh embodiment of the present invention.

FIG. 38 is a longitudinal sectional view illustrating connection between adjacent heat-insulating structural materials shown in FIG. 37.

BEST MODE

Hereinafter, embodiments of the present invention will be described in detail with reference to the accompanying drawings.

Referring to the accompanying drawings, a heat-insulating structural material according to an embodiment of the present invention includes: a lower plate 10; an upper plate 20 disposed above the lower plate 10 to be separated a constant distance from the lower plate 10; an intermediate layer 50 interposed between the lower plate 10 and the upper plate 20 and including a heat insulator; a connecting portion provided to a distal end of each of the lower plate 10 and the upper plate 20 and composed of a combination of a metal layer and a non-metal layer; and a core layer 40 disposed in a space defined by the lower plate 10, the upper plate 20, the intermediate layer 50, and the connecting portion.

A non-foaming polymer according to this embodiment includes a non-foaming polyurethane.

The connecting portion acts as a periphery of each of the upper and lower plates and secures structural fastening between members connected to each of the heat-insulating structural material or between the heat-insulating structural materials to prevent thermal bridging while securing structural fastening.

The connecting portion may be independent of the upper and lower plates 20, 10, may be integrally formed therewith, or may be formed as portions thereof.

The connecting portion may have a width of 20 mm to 300 mm; the heat insulator may have a thermal conductivity of 0.01 W/m·K or less.

The core layer 40 serves to transfer shear force between the upper and lower plates 20, 10.

The core layer 40 is bonded to the upper and lower plates 20, 10 to have sufficient bonding strength and includes a material, for example, a non-foaming polymer, which exhibits sufficient mechanical properties with respect to expectable shear force in use.

The non-foaming polymer may include polyurethane, an epoxy resin, a phenol resin, an unsaturated polyester, a vinyl ester, natural rubber, and synthetic rubber, preferably a polyurethane resin.

A bonding strength between the core layer 40 and the upper and lower plates 20, 10 may be greater than 3 MPa, preferably greater than 6 MPa.

Upon application of low load as in a floor panel generally having a use and occupancy load of 1.4 kPa to 7.2 kPa, the bonding strength therebetween may be lower, for example, about 0.5 MPa.

The core layer 40 may have a density of 900 kg/m³ or more, preferably 900 kg/m³ to 1,900 kg/m³.

The core layer may have an elastic modulus of 200 MPa or more, preferably 300 MPa or more.

The heat-insulating structural material according to the present invention may have at least one structure of a panel type structure in which one upper plate is disposed on one lower plate to connect adjacent heat-insulating structural materials to each other (see FIG. 2 to FIG. 32) and an overlap type structure in which a number of upper plates is disposed on one lower plate in a lattice shape (see FIG. 33 and FIG. 34).

The panel type structure may be applied to a heat-insulating structural material fabricated as units or modules each having a certain size and assembled on a construction site, and the overlay type structure may be applied to a heat-insulating structural material directly fabricated on the construction site.

The heat-insulating structural material according to the present invention may also have a combined structure of the panel type structure and the overlay type structure.

In the panel type structure, the heat-insulating structural material may be divided as follows depending upon the shape of the connecting portion.

The panel type heat-insulating structural material includes: ① a heat-insulating structural material 100 (see FIG. 2 and FIG. 3) to which a connecting portion of a block laminate structure is applied; ② a heat-insulating structural material 200 (see FIG. 4) to which a connecting portion of a filling laminate structure is applied; ③ a heat-insulating structural material 300 (see FIG. 13 to FIG. 26) to which a connecting portion of a block step structure is applied; ④ a heat-insulating structural material 400 (see FIG. 27A to FIG. 28B) to which a connecting portion of a filling step structure is applied; ⑤ a heat-insulating structural material 500 (see FIG. 29 and FIG. 30) to which a connecting portion of a filling finished structure is applied; and ⑥ a heat-insulating structural material 600 (see FIG. 31 and FIG. 32) to which a connecting portion of a bolt fastening structure is applied.

Now, the heat-insulating structural material 100 (first embodiment) to which the connecting portion of the block laminate structure is applied will be described with reference to FIG. 2 and FIG. 3.

FIG. 2 is a perspective view of the heat-insulating structural material 100 according to the first embodiment of the present invention and FIG. 3 is a longitudinal sectional view of the heat-insulating structural material shown in FIG. 2.

The heat-insulating structural material 100 according to the first embodiment of the present invention includes: a lower plate 10 formed of a metallic material; an upper plate 20 formed of a metallic material and disposed above the lower plate 10 to be separated a constant distance from the lower plate 10 and to define a space S between the upper plate 20 and the lower plate 10; a connecting portion 130 provided to a distal end of each of the lower plate 10 and the upper plate 20; and a core layer 40 formed by injecting a liquid material for the core layer 40 into a box space defined by the lower plate 10, the upper plate 20, and the connecting portion 130.

The space S is filled with a non-metal layer, for example, the core layer 40 formed of a non-foaming polymer or polyurethane and thus disappears after fabrication of the heat-insulating structural material.

Since the non-foaming polymer constituting the core layer 40 tends to slightly expand during curing after injection of the non-foaming polymer in a liquid phase, a process of pressing the non-foaming polymer through application of load to the upper plate 20 during injection is performed. Due to such characteristics of non-foaming polymer, the present invention has an advantage in that the space S is very air-tightly filled with the core layer 40.

The lower plate 10 and the upper plate 20 may be formed in a flat structure and may be formed of a metallic material, for example, SUS, Invar, and the like, or a composite material including a metal. As an example of the composite material including a metal, Triplex used for an LNG cargo tank has a structure in which a glass cloth and a resin surround a thin aluminum plate, and exhibit good behavior at ultra-low temperature.

For reference, SUS is an abbreviation of 'Steel Use Stainless' and indicates a stainless steel standard in accordance with JIS.

An upper surface of the upper plate 20 directly adjoining liquefied gas may be formed with multiple corrugations (not shown).

In this embodiment, the connecting portion may act to secure the heat-insulating structural material 100 to a sub-structure 1 (see FIG. 19) or to connect adjacent heat-insulating structural materials 100 to each other.

The connecting portion 130 may include a mixture of a metal layer and a non-metal layer.

For reference, the sub-structure 1 may be a portion of a cargo tank of a ship or an independent type tank body, or may include a base frame or a plate of a building structure. It should be understood that the shape or structure of the sub-structure 1 is provided for illustration and the present invention is not limited thereto.

The shape of the connecting portion 130 is not limited to the shape illustrated in the drawings and includes a polygonal or circular bar or stick shape, a rectangular frame shape, or a peripheral member shape. The connecting portion 130 serves to prevent the liquid non-foaming polymer from flowing upon injection and curing of the liquid non-foaming polymer for formation of the core layer 40.

As shown in FIG. 3A, the connecting portion 130 may include: a lower connecting portion 131 formed of a metallic material; an upper connecting portion 132 formed of a metallic material; and a non-metal layer 133, for example, a non-foaming polymer, interposed in the same shape as the lower connecting portion 131 and the upper connecting portion 132, as an intermediate connecting portion between the lower connecting portion 131 and the upper connecting portion 132 to bond (attach) the lower connecting portion 131 to the upper connecting portion 132. As such, the connecting portion 130 may be composed of a combination of the metal layer and the non-metal layer.

In formation of the connecting portion 130, the lower connecting portion 131, the upper connecting portion 132 and the non-foaming polymer 133 may be integrated with one another by bonding (or attachment) to one another after formation through separate processes (not shown).

For example, for bonding (or attaching) the lower connecting portion 131, the upper connecting portion 132 and the non-foaming polymer (intermediate connecting portion) 133 to one another, each of the lower connecting portion 131 and the upper connecting portion 132 may be formed in a block shape and a space between the lower connecting portion 131 and the upper connecting portion 132 may be filled with the non-foaming polymer 133, followed by curing, thereby forming the connecting portion 130 in an integral shape.

Alternatively, as shown in FIG. 3B, the connecting portion 130 may include: a lower connecting portion 131 formed of a metallic material; an upper connecting portion 132 formed of a metallic material; and a non-metal layer 133, for example, a non-foaming polymer, interposed in a T-shape as an intermediate connecting portion between the lower connecting portion 131 and the upper connecting portion 132 to bond (attach) the lower connecting portion 131 to the upper connecting portion 132.

FIG. 4 is a longitudinal sectional view of the heat-insulating structural material 200 to which the connecting portion of the filling laminate structure is applied.

Referring to FIG. 4, the heat-insulating structural material 200 according to the second embodiment has the same structure as the heat-insulating structural material 100 according to the first embodiment except for the connecting portion. Thus, the following description will focus on a connecting portion 230.

In the heat-insulating structural material 200 according to the second embodiment, the connecting portion 230 includes a non-metal layer 233, for example, a non-foaming polymer, interposed as an intermediate connecting portion between a lower connecting portion 231 and an upper connecting portion 232. As such, the connecting portion 230 may be composed of a combination of the metal layer and the non-metal layer.

Instead of forming the non-foaming polymer in a block shape as in the first embodiment, with the lower connecting portion 231 and the upper connecting portion 232 disposed on the lower plate 10 and the upper plate 20, respectively, the non-metal layer 233 is formed together with the core layer 40 between the lower connecting portion 231 and the upper connecting portion 232 in the course of injecting and curing a liquid non-foaming polymer to form the core layer 40, thereby minimizing thermal bridging while further improving thermal insulation performance and structural performance.

FIG. 5 to FIG. 7 are longitudinal sectional views illustrating a process of forming the intermediate layer in the heat-insulating structural material 100 according to the first embodiment of the present invention.

In the heat-insulating structural material 100 according to the first embodiment of the present invention, a space S is formed between the lower plate 10 and the upper plate 20 and the intermediate layer 50 may be further disposed in the space S at at least one location selected from among a lower side of the upper plate 20 (see FIG. 5), an inside the core layer 40 (see FIG. 6), or an upper side of the lower plate 10 (see FIG. 7). In FIG. 6, S1 and S2 indicate a spacer or a support membrane and mean a member for maintaining a constant gap or supporting the intermediate layer 50.

The intermediate layer 50 may be formed of a vacuum heat insulator alone, in which the vacuum heat insulator may have a thickness of, for example, about 5 mm to 25 mm and is interposed between the core layer 40 and the upper plate 20 to maintain the core layer (formed of the non-foaming polymer) 40 at an allowable temperature (−30° C. to −70° C.) or more by blocking ultra-low temperature, that is, in an allowable temperature range of the non-foaming polymer, thereby effectively preventing ultra-low temperature brittle fracture.

According to this embodiment, the intermediate layer may include at least one selected from the group of an aerogel heat insulator and slim organic and inorganic heat insulators instead of the vacuum heat insulator, and may also include an amorphous heat insulator (gas, liquid, or gel type heat insulator), which is difficult to use in the art.

The vacuum heat insulator may have a thermal conductivity (W/m·K, at 20° C.) of about 0.0045 or less. The aerogel heat insulator may include Aspen aerogels, Thermablock, and the like, and may have a thermal conductivity (W/m·K, at 20° C.) of about 0.015 or less.

The vacuum heat insulator includes a core, an outer cover surrounding the core in a vacuum, and a metal foil interposed between the core and the outer cover and formed of aluminum. The structure of the vacuum heat insulator is well known in the art and detailed description thereof will be omitted.

As shown in FIG. 5, the intermediate layer 50 includes the vacuum heat insulator and may be disposed to slip on the upper plate 20 when the intermediate layer 50 is disposed at the lower side of the upper plate 20.

The core layer 40 serves to protect the vacuum heat insulator from external impact and is formed by injecting the liquid non-foaming polymer into the space S such that the liquid non-foaming polymer can be air-tightly bonded to an inner surface of the space to maintain structural stiffness of the core layer.

Referring to FIG. 8 to FIG. 10, the intermediate layer 50 essentially consists of the vacuum heat insulator 51 and may further include at least one selected from the group of a vacuum heat insulator surface-protection material 52, a slip material 53 and a reinforcing heat insulator 54 on the vacuum heat insulator 51.

The vacuum heat insulator has a density of about 150 kg/m$^3$ to 300 kg/m$^3$, which is higher than that of other foaming heat insulators, and is very resistant to compressive load. However, the vacuum heat insulator disadvantageously suffers from significant deterioration in thermal insulation performance when the coating of the vacuum heat insulator is scratched or torn to form fine apertures.

According to this embodiment, in consideration of such a disadvantage of the vacuum heat insulator, when the upper plate 20 and the lower plate 10 are formed of metal plates, sharp protrusions (not shown) can be formed on the surface of the upper plate 20 due to dust or foreign matter, thereby causing damage to the coating of the vacuum heat insulator 51 during fabrication thereof. In order to solve this problem, the vacuum heat insulator surface-protection material 52 is disposed on the vacuum heat insulator 51. The vacuum heat insulator surface-protection material 52 has a film shape and protects the coating of the vacuum heat insulator 51.

The vacuum heat insulator is disposed between the core layer 40 and the upper plate 20 and has thermal insulation performance; and the vacuum heat insulator surface-protection material 52 is disposed between the vacuum heat insulator and the upper plate 20 to prevent damage to the coating of the vacuum heat insulator; and the slip material 53 allows slipping of the intermediate layer with respect to the upper plate 20.

The slip material 53 guides more smooth slipping of the intermediate layer 50 and may include corrugated cardboard, a synthetic resin sheet, and the like.

The slip material 53 may have a smooth surface. A smoother surface of the slip material 53 guides more efficient slipping at an ultra-low temperature, thereby effectively preventing ultra-low temperature brittle fracture of the core layer 40 and thermal stress caused by difference in coefficient of thermal expansion between the core layer 40 and the upper plate 20 formed of a metallic material and directly contacting a cryogenic liquefied gas.

Difference in coefficient of thermal expansion between the upper plate 20 formed of a metallic material and the core layer 40 formed of a polyurethane material can cause thermal stress.

For reference, thermal stress refers to stress generated inside a solid due to temperature change. The coefficient of thermal expansion of the core layer 40 formed of the polyurethane material is about 4 to 10 times that of the upper plate 20 formed of the metal and such a difference in coefficient of thermal expansion therebetween generates thermal stress, thereby causing significant deterioration in performance of the structural material.

According to this embodiment, in consideration of this problem, the heat-insulating structural material can substantially reduce thermal stress due to difference in coefficient of thermal expansion while effectively preventing ultra-low temperature brittle fracture through a simple structural change of adding the slip material to the intermediate layer 50.

An upper surface of the intermediate layer 50 may slippably adjoin a lower surface of the upper plate 20 and a lower surface of the intermediate layer 50 may be bonded to the core layer 40.

The core layer 40 may be very closely bonded to the inner surface of the box space defined by the lower plate 10, the upper plate 20 and the connecting portion 130 to air-tightly surround and protect the entire surface of the vacuum heat insulator, thereby enabling effective distribution of compressive load of the core layer 40 while allowing the structural material to exhibit sufficient functions thereof.

In a coupling structure between the lower plate 10, the upper plate 20, the connecting portion 130, the core layer (formed of the non-foaming polymer) (40), and the intermediate layer 50, the core layer 40 may be air-tightly or liquid-tightly bonded or attached to the inner surface of the box space defined by the lower plate 10, the connecting portion 130 and the intermediate layer 50.

Since the core layer 40 can be air-tightly or liquid-tightly closely bonded or attached to the inner surface of the box space in the course of curing, rigid coupling of the core layer 40 can be achieved without a separate bonding agent.

The lower connecting portion 131 and the upper connecting portion 132 of the connecting portion 130 may be secured to the lower plate 10 and the upper plate 20 by welding or bolt fastening, respectively.

The intermediate layer 50 and the upper plate 20 do not employ a bonding agent and may be maintained in a slippably contacting state with respect to each other.

In order to achieve substantial reduction in thermal stress and to prevent transfer of the thermal stress, it is important to secure slipping between the upper plate 20 and a structure under the upper plate 20, and the slip material 53 is disposed to guide more efficient slipping therebetween.

In addition, although not shown in the drawings, other reinforcing heat insulators may be disposed together with the vacuum heat insulator to satisfy an insulation design standard in the case where the insulation design standard is not satisfied by one sheet of vacuum heat insulator.

Furthermore, although not shown in the drawings, an impact reliever (not shown) may be further added in order to absorb impact energy transferred to the vacuum heat insulator when the heat-insulating structural material can be subjected to significant external impact.

FIGS. 11A and 11B are sectional views of a connector disposed between the upper plate and the lower plate.

Referring to FIGS. 11A and 11B, a connector 70 may be disposed between the upper plate 20 and the lower plate 10.

By a connection structure of the connector 70, the upper plate 20 is connected to the core layer 40 under a strong load of, for example, 3 MPa or more, whereby load applied to the heat-insulating structural material 100 can be evenly distributed and all of the upper and lower plates 20, 10 and the core layer 40 move in the same direction with respect to the load, thereby effectively preventing delamination while achieving substantial improvement in structural performance.

Referring to FIG. 11A, the connector 70 may be secured at an upper end thereof to the upper plate 20 and at a lower end thereof to the core layer 40.

That is, the connector 70 includes a web 71 penetrating a clearance (through-hole) of the intermediate layer 50 and a flange 72 secured inside the core layer 40.

Referring to FIG. 11B, the connector 70 may be secured at both ends thereof to the core layer 40. That is, the web 71 of the connector 70 may penetrate the clearance (through-hole) of the intermediate layer 50 and both flanges 72 of the connector 70 may be secured inside the core layer 40.

The installation location and the shape of the connector are not limited to these embodiments and may be modified in various ways.

In order to prevent heat transfer through the connector 70, the connector 70 may be formed of a material having a low thermal conductivity and may be coated with a heat insulating material.

FIG. 12 is a sectional view of a core layer having weight reduction members 80 therein.

Referring to FIG. 12, the core layer 40 may be provided therein with lightweight members 80. The lightweight members 80 may be bubble cores such as ping-pong balls (sphere).

The lightweight members 80 may be disposed adjacent to one another or may be arranged at constant intervals. The lightweight member 80 may be formed of a non-foaming polymer or a material having affinity with the non-foaming polymer in order to secure close bonding to the core layer 40, without being limited thereto.

With the structure wherein the lightweight members 80 are densely disposed inside the core layer 40, the heat-insulating structural material can achieve weight reduction and improvement in stiffness and insulation performance.

FIG. 13 is a perspective view of a heat-insulating structural material 300 to which a connecting portion of a block step structure is applied and FIG. 14 is a longitudinal sectional view of the heat-insulating structural material 300 shown in FIG. 13.

Referring to FIG. 13 and FIG. 14, the heat-insulating structural material 300 according to the third embodiment of the present invention includes: a lower plate 10 formed of a metallic material; an upper plate 20 formed of a metallic material and disposed above the lower plate 10 to be separated a constant distance from the lower plate 10 and to define a space S between the upper plate 20 and the lower plate 10; a connecting portion 330 provided to a distal end of each of the lower plate 10 and the upper plate 20 and composed of a combination of a metal layer and a non-metal layer to prevent thermal bridging while securing structural fastening; and a core layer 40 formed by injecting a liquid material for the core layer 40 into a box space defined by the lower plate 10, the upper plate 20, and the connecting portion 330 to be filled therewith.

In this embodiment, the connecting portion 330 may include a lower connecting portion 331 secured to the lower plate 10 and formed of a metallic material; an upper connecting portion 332 secured to the upper plate 20 to be stepped with respect to the lower connecting portion 331 and formed of a metallic material; and a non-metal layer 333 interposed as an intermediate connecting portion between the lower connecting portion 331 and the upper connecting portion 332 by, for example, filling a gap between the lower connecting portion 331 and the upper connecting portion 332 with a non-foaming polymer to form a filling step and block connection structure. As such, the connecting portion 330 may be composed of a combination of the metal layer and the non-metal layer.

The non-foaming polymer 333 may be integrated with the core layer 40 in the course of curing the core layer 40 formed of the non-foaming polymer.

A finishing member 340 includes a metal plate 341 at an upper portion thereof and a non-foaming polymer block 342 formed on a lower surface of the metal plate 341. The metal plate 341 may be secured to the upper connecting portion 332 by welding or bolt fastening.

Although coupling is performed by welding or bolt fastening in this embodiment, it should be understood that the present invention is not limited thereto and other coupling methods may be adopted depending upon design conditions or construction methods.

FIG. 15 to FIG. 26 illustrate the heat-insulating structural material 300 having the connecting portion of the block step structure. In the heat-insulating structural material 300 according to the third embodiment, the lower connecting portion 331 may be secured to an upper periphery of the lower plate 10 formed of the metallic material by welding or bolt fastening. Then, multiple spacers S1 are suitably disposed on an upper surface of the lower plate 10 and the intermediate layer (for example, a vacuum heat insulator) 50 is disposed on the spacers S1.

As a result, the lower plate 10 and the vacuum heat insulator 50 are separated a constant distance from each other to define a space therebetween by the spacers S1. Then, multiple spacers S2 are disposed on the vacuum heat insulator 50 and the upper plate 20 is disposed on the spacers S2. The upper plate 20 is provided at the periphery thereof with the upper connecting portion 332.

The core layer 40 is formed by injecting a liquid non-foaming polymer into the space between the lower plate 10 and the upper plate 20, followed by curing the liquid non-foaming polymer, and the non-metal layer 333, for example, a non-foaming polymer, is formed as an intermediate connecting portion between the lower connecting portion 331 and the upper connecting portion 332.

The vacuum heat insulator may be composed of an outer foil and an inner filling material (fumed silica or glass wool) and is formed to maintain a vacuum in order to prevent introduction of air/gas thereinto. In particular, fumed silica is similar to sand particles and is composed of a nonflammable material, and glass wool can also be used as a fireproof material.

The heat-insulating structural material 300 according to the present invention is disposed on a sub-structure 1 (see FIG. 19) and has a block step structure to be disposed adjacent to another heat-insulating structural material 300, and finishing members 340, 350 are secured between the adjacent heat-insulating structural materials 300.

Each of the finishing members 340, 350 includes a metal plate 341 disposed at an upper portion thereof and a non-foaming polymer block 342 formed on a lower surface of the metal plate 341 to be stepped. The metal plate 341 may have the same thickness as the upper plate 20 to be coplanar therewith. Although not shown in the drawings, the non-foaming polymer block 342 may be formed by injecting and curing a liquid non-foaming polymer. That is, the non-foaming polymer block 342 may be formed by injecting and curing a liquid non-foaming polymer into a space under the metal plate 341.

In this embodiment, the finishing members 340, 350 may include a cross-shaped finishing member (see FIG. 22, FIG. 23 and FIG. 24) disposed at adjacent corners of four heat-insulating structural materials; and a linear finishing member 350 (see FIG. 24) disposed at adjacent edges of two heat-insulating structural materials.

In this embodiment, the sub-structure 1 may be a portion of a cargo tank of a ship or an independent type tank body, or may include a base frame or a plate of a building structure. It should be understood that the shape or structure of the sub-structure 1 is provided for illustration and the present invention is not limited thereto.

The heat-insulating structural material assembly of the present invention may be applied to various fields, for example, heat insulation systems of ship cargo tanks, freezing warehouses, buildings, and the like, which are required to perform both a structural material function and a heat insulation function at the same time.

In installation of the heat-insulating structural material 300, the heat-insulating structural materials 300 are disposed adjacent to each other on the sub-structure 1 and are firmly secured thereto by fastening bolts B into bolt holes 331a. Here, a gap generated between the lower plate 10 and the lower plate 10 is filled with a sealant 2 (see FIG. 22). Then, the finishing members 340, 350 are secured between the heat-insulating structural materials 300. The metal plates 341 of the finishing members may be secured to the upper connecting portion 332 by bolt fastening or welding.

Although not shown in the drawings, the heat-insulating structural material 300 according to the third embodiment may include the intermediate layer, the connector, and the weight reduction members disclosed in the first embodiment.

FIGS. 27A to 27C illustrate a method for forming the heat-insulating structural material 400 to which the connecting portion of the filling step structure is applied, and FIG. 28 is a longitudinal sectional view of the heat-insulating structural material 400 to which the connecting portion of the filling step structure is applied.

Referring to FIGS. 27A to 27C and FIGS. 28A to 28B, in the heat-insulating structural material 400 according to the fourth embodiment, a lower connecting portion 431 is formed along the periphery of an upper surface of the lower plate 10, lower spacers S1 are disposed on the upper surface of the lower plate 10, and an intermediate layer 50 is placed on the lower spacers S1 to maintain a predetermined distance from the lower plate 10.

Upper spacers S2 are placed on an upper surface of the intermediate layer 50 and an upper connecting portion 432 is formed along the periphery of a lower surface of the upper plate 20 to maintain a predetermined distance from the intermediate layer 50 via the upper spacers S2.

A gap between the lower connecting portion 431 and the upper connecting portion 432 is blocked by a temporary blocking member 170 and a core layer 40 is formed by injecting a liquid non-foaming polymer into an upper space formed between the lower plate 10 and the upper plate 20 through apertures (holes for injection of the liquid non-foaming polymer, not shown), followed by curing the liquid non-foaming polymer. The temporary blocking member 170 may be formed of a material exhibiting low affinity with respect to liquid polyurethane, for example, Teflon®.

Here, a non-metal layer 433 of, for example, a non-foaming polymer, may be formed as an intermediate connecting portion between the lower connecting portion 431 and the upper connecting portion 432. As such, the connecting portion 430 may be composed of a combination of the metal layer and the non-metal layer.

In the heat-insulating structural material 400 to which the connecting portion 430 of the filling step structure is applied, the non-metal layer 433 is formed together with the core layer 40 to be integrated therewith between the lower connecting portion 431 and the upper connecting portion 432 in the course of injecting and curing the liquid non-foaming polymer to form the core layer 40.

As such, the core layer 40 is formed together with the non-metal layer 433, thereby minimizing thermal bridging while further improving heat insulation and structural material performance.

The finishing member 440 may be disposed between the heat-insulating structural materials. In the coupling structure of the finishing member 440, a metal plate 441 of the finishing member 440 may be welded to the upper connecting portion 432, as shown in FIG. 28(a).

Alternatively, the metal plate 441 of the finishing member 440 may be fastened to the upper connecting portion 432 by a bolt B, as shown in FIG. 28(b).

It should be understood that the coupling structure is not limited to welding or bolt fastening and may be realized by other coupling methods depending upon design conditions and construction methods.

FIG. 29 and FIG. 30 are longitudinal sectional views of the heat-insulating structural material 500 to which the connecting portion of the filling finished structure is applied.

Referring to FIG. 29 and FIG. 30, the heat-insulating structural material 500 according to the fifth embodiment of the present invention includes: a lower plate 10 formed of a metallic material; an upper plate 20 formed of a metallic material and disposed above the lower plate 10 to be separated a constant distance from the lower plate 10 and to define a space S between the upper plate 20 and the lower plate 10; a connecting portion 530 provided to a distal end of each of the lower plate 10 and the upper plate 20 and composed of a combination of a metal layer and a non-metal layer to prevent thermal bridging while securing structural fastening; and a core layer 40 formed by filling a space defined by the lower plate 10, the upper plate 20, and the connecting portion 330 with a liquid non-foaming polymer.

The connecting portion 530 may have the filling finished structure wherein an upper connecting portion 532 is detachably coupled to the upper plate 20 and a non-metal layer 533, for example, a non-foaming polymer, is formed as an intermediate connecting portion to be integrated with the core layer 40 by injecting a liquid non-foaming polymer into a space between the lower connecting portion 531 and the upper connecting portion 532, followed by curing the liquid non-foaming polymer. The connecting portion 530 may connect adjacent heat-insulating structural materials 500 to each other. As such, the connecting portion 530 may be composed of a combination of the metal layer and the non-metal layer.

In other words, the heat-insulating structural material 500 may be formed by inserting both ends of the upper connecting portion 532 into grooves 41 of the core layer 40 and injecting the liquid non-foaming polymer into the space between the upper connecting portion 532 and the lower connecting portion 531, followed by curing the liquid non-foaming polymer. A filler 2 such as glass wool may be disposed between the lower connecting portions 531.

In the course of injecting and curing the liquid non-foaming polymer, the liquid non-foaming polymer is air-tightly bonded to the space between the upper connecting portion 532 and the lower connecting portion 531 such that the core layer 40 is integrally connected to the non-metal layer 533, thereby effectively preventing thermal bridging while further improving not only thermal insulation performance and structural material performance but also productivity through simplification of the construction operation.

FIG. 31 is a perspective view of a bolt fastening type heat-insulating structural material and FIG. 32 is a longitudinal sectional view of the bolt fastening type heat-insulating structural material.

Referring to FIG. 31 and FIG. 32, the heat-insulating structural material 600 according to the sixth embodiment includes: a lower plate 10 formed of a metallic material; an upper plate 20 formed of a metallic material and disposed above the lower plate 10 to be separated a constant distance from the lower plate 10 and to define a space S between the upper plate 20 and the lower plate 10; a connecting portion 630 provided to a distal end of each of the lower plate 10 and the upper plate 20 and composed of a combination of a metal layer and a non-metal layer to prevent thermal bridging while securing structural fastening; and a core layer 40 formed by injecting a liquid non-foaming polymer into a space defined by the lower plate 10, the upper plate 20, and the connecting portion 630 to be filled therewith, followed by curing the liquid non-foaming polymer.

According to this embodiment, each of the lower plate 10 and the upper plate 20 has fastening holes H disposed along the periphery thereof and vertically penetrating the lower plate 10 and the upper plate 20 and the connecting portion 630 is coupled to the fastening holes H such that the heat-insulating structural material can be coupled to a sub-structure 1. That is, bolts 631 are inserted into the fastening holes H and nuts 632 are fastened to distal ends of the bolts 631, thereby securing the heat-insulating structural material 600 to the sub-structure 1 (see FIG. 19).

According to this embodiment, in order to allow a vacuum heat insulator to act as a structural material, a bonding strength between the core layer 40 (non-foaming polymer) and inner surfaces of the metal plates (the upper and lower plate or the connecting portion) may be set to 3 MPa to 15 MPa.

Such bonding strength of the core layer 40 is set to allow the non-foaming polymer to act as a structural material through integration with the metal box (box formed by the upper and lower plates and the connecting portion) surrounding the core layer 40.

When the metal box is bonded (attached) to the core layer 40 with such bonding strength, the heat-insulating structural material can act as a structural material applicable to main components of a ship subjected to substantially complex load.

That is, in order to realize functions of the structural material through bonding strength between the core layer 40 of the non-foaming polymer and the metal box, the core layer 40 of the non-foaming polymer is air-tightly bonded to the upper and lower plates 20, 10 and the connecting portion, whereby the core layer 40 is integrated with the vacuum heat insulator 51 to act as a monolithic structure with respect to various complex loads.

FIG. 33 and FIG. 34 illustrate an overlap type structure in which a number of upper plates is disposed on one lower plate in a lattice shape.

The overlay type heat-insulating structural material will be described by way of example and may also be applied in the same way as the panel type heat-insulating structural material without being limited to the drawings.

FIG. 33 is a longitudinal sectional view of a heat-insulating structural material 700 according to the seventh embodiment of the present invention, in which a number of upper plates 20 is disposed on one lower plate 10 in a lattice shape to allow a liquid non-foaming polymer to be dividedly injected.

In a way of stacking a number of components on one lower metal plate 10, a connecting portion 730 composed of metal layers 731, 732 and a non-metal layer 733 may be provided to a distal end of each of a lower metal 10 formed of a metal and an upper plate 20 formed of a metal, and a core layer 40 may be formed between the lower plate 10 and the upper plate 20.

An intermediate layer 50, for example, a vacuum heat insulator, may be disposed inside the core layer 40.

Lower spacers S1 and upper spacers S2 serve to support the intermediate layer 50 while maintaining constant distances of the intermediate layer 50 with respect to the lower plate 10 and the upper plate 20.

FIG. 34 is a longitudinal sectional view of a heat-insulating structural material 800 according to an eighth embodiment of the present invention. In the heat-insulating structural material 800, a lower connecting portion 831 is formed along the periphery of an upper surface of the lower plate 10, lower spacers S1 are disposed on the upper surface of the lower plate 10, and an intermediate layer 50 is placed on the lower spacers S1 to maintain a predetermined distance from the lower plate 10.

Upper spacers S2 are placed on an upper surface of the intermediate layer 50 and an upper connecting portion 832 is formed along the periphery of a lower surface of the upper plate 20 to maintain a predetermined distance from the intermediate layer 50 via the upper spacers S2.

A gap between the lower connecting portion 831 and the upper connecting portion 832 is blocked and a core layer 40 is formed by injecting a liquid non-foaming polymer into a space formed between the lower plate 10 and the upper plate 20 through apertures (holes for injection of the liquid non-foaming polymer, not shown), followed by curing the liquid non-foaming polymer. Here, a non-metal layer 833, for example, a non-foaming polymer, may be formed as an intermediate connecting portion between the lower connecting portion 831 and the upper connecting portion 832. As such, the connecting portion 830 may be composed of a combination of the metal layer and the non-metal layer.

The non-metal layer 833 corresponding to an intermediate connecting portion is formed together with the core layer 40 to be integrated therewith between the lower connecting portion 831 and the upper connecting portion 832 in the course of injecting and curing the liquid non-foaming polymer to form the core layer 40, thereby minimizing thermal bridging while further improving heat insulation and structural material performance.

A finishing member 840 may be disposed between the heat-insulating structural materials and the metal plate 441 of the finishing member 840 may be fastened to the upper connecting portion 432 by a bolt B.

FIG. 35 is a longitudinal sectional view of a heat-insulating structural material according to a ninth embodiment of the present invention.

Referring to FIG. 35, according to the classification society that approves the safety of ships, a detector (not shown) may be required to detect gas leakage when cracks occur in a plate contacting liquefied gas, for example, an upper plate 20 and the gas flows as indicated by a dashed arrow. In a typical LPG and LNG membrane type, a pipe is connected to a gap between insulating boxes to circulate inert gas (for example, $N_2$) and the concentration of the inert gas is monitored by a gas recovery unit of the detector to detect gas leakage.

According to this embodiment, in order to detect gas leakage when cracks occur in a plate contacting liquefied gas, for example, an upper plate 20 and the gas flows as indicated by a dashed arrow, since the core layer 40 does not have a gap therein, an inert gas circulation pipe 840 may be inserted into the non-metal layer 833 corresponding to the intermediate connecting portion, and a gas tube 850 may be connected to the inert gas circulation pipe 840 and extends to a zone where cracks can occur.

The gas tube 850 may be disposed between the intermediate layer 50 and upper connecting portion 832 to allow leaked gas to flow into the gas tube 850. The inert gas is circulated through the inert gas circulation pipe 840 and the concentration of the inert gas is monitored by the gas recovery unit of the detector, thereby enabling easy confirmation of gas leakage.

Furthermore, the gas tube 850 may be provided at a distal end thereof with a mesh or filter 860 to prevent the liquid non-foaming polyurethane from entering the gas tube 850 in the course of forming the core layer 40.

FIG. 36 is a longitudinal sectional view of a heat-insulating structural material according to a tenth embodiment of the present invention.

Referring to FIG. 36, the heat-insulating structural material 1100 according to the tenth embodiment includes: an upper metal plate 20; a lower metal plate 10 disposed below the upper metal plate 20 to define a space therebetween; a vacuum heat insulator 51 inserted into the space between the upper metal plate 20 and the lower metal plate 10; and a non-foaming resin 40 surrounding the entirety of the vacuum heat insulator 51 while being closely bonded to inner surfaces of the upper metal plate 20 and the lower metal plate 10.

The non-foaming resin 40 includes an elastomer that is a synthetic resin of a polyethylene (LDPE)-based elastic polymer.

Since the non-foaming resin 40 surrounds the entirety of the vacuum heat insulator 51, the non-foaming resin 40 is formed between the upper metal plate 20 and the lower metal plate 10 to protect the vacuum heat insulator from external impact while maintaining structural stiffness (function as the structural material). The non-foaming resin 40 is provided as one example of the core layer and may be formed by injecting and curing a liquid non-foaming resin.

The heat-insulating structural material according to this embodiment includes a high performance heat insulator, for example, a vacuum heat insulator, thereby exhibiting excellent performance in terms of heat insulation.

In application of the vacuum heat insulator, in order to satisfy a passive house thermal transmittance, that is, 0.15 $W/m^2 \cdot K$, the upper metal plate 20, the non-foaming resin 40, the vacuum heat insulator 51, and the lower metal plate 10 are optimally formed to thicknesses of 4 mm to 6 mm, 15 mm to 25 mm, 10 mm to 20 mm, and 4 mm to 6 mm, respectively, thereby securing sufficient thermal insulation.

The non-foaming resin 40 is very closely attached (or bonded) to the upper metal plate 20, the lower metal plate 10 and the surface of the vacuum heat insulator 51 disposed between the upper metal plate 20 and the lower metal plate 10, thereby improving durability. In addition, the non-foaming resin 40 is formed to a constant thickness at opposite distal ends of the heat-insulating structural material 1100, thereby minimizing heat transfer by preventing thermal bridging through a metallic material.

Further, the heat-insulating structural material according to this embodiment can further improve performance of the heat insulator. That is, a typical heat insulator is vulnerable to impact and fine cracks on an external surface of the heat insulator can cause deterioration in thermal insulation performance due to entry and exit of a gas therethrough over time. In the heat-insulating structural material according to this embodiment, the closed metal box and the non-foaming resin 40 having a high density surround the entire outer surface of the vacuum heat insulator 51, thereby preventing deterioration in thermal insulation performance.

As such, according to this embodiment, the heat-insulating structural material has an increased thickness at opposite distal ends thereof and can improve structural stiffness using the non-foaming polymer, and the core layer of the non-foaming polymer surrounds the entire outer surface of the vacuum heat insulator to prevent gas passage through the vacuum heat insulator, thereby maintaining the vacuum heat insulator in a vacuum for a long period of time.

Although a typical vacuum heat insulator includes an outer coating formed of a metallic material and covering an outer surface thereof, the typical vacuum heat insulator has a problem of gradual decrease in vacuum through permeation of air therethrough. However, according to the present invention, since the non-foaming resin 40 surrounds the entirety of the vacuum heat insulator, the vacuum heat insulator does not suffer from gas passage therethrough and thus prevents bubble generation in the non-foaming resin 40, thereby preventing deterioration in heat insulation and structural stiffness due to bubbles.

FIG. 37 is a longitudinal sectional view of a heat-insulating structural material according to an eleventh embodiment of the present invention and FIG. 38 is a longitudinal sectional view of a connection between adjacent heat-insulating structural materials shown in FIG. 37.

Referring to FIG. 37, the heat-insulating structural material 1200 according to the eleventh embodiment includes: an upper metal plate 20; a lower metal plate 10 disposed below the upper metal plate 20 to define a space therebetween; a vacuum heat insulator 51 inserted into the space between the upper metal plate 20 and the lower metal plate 10; a non-foaming resin 40 surrounding the entirety of the vacuum heat insulator 51 while being closely bonded to inner surfaces of the upper metal plate 20 and the lower metal plate 10; and a connecting portion (periphery portion) 1230 provided to a distal end of each of the lower metal plate 10 and the upper metal plate 20.

Since the non-foaming resin 40 is very closely bonded inside the box space defined by the lower plate 10, the upper plate 20, and the connecting portion 1230, the heat-insulating structural material has a strong bonding structure, can effectively prevent delamination, can improve structural stiffness, and can prevent gas passage to prevent bubble generation inside the non-foaming resin 40, thereby preventing deterioration in heat insulation and structural stiffness due to bubbles.

In addition, although the connecting portion (periphery portion or finishing portion) 1230 may have a combined structure in order to prevent thermal bridging and to secure structural fastening and connection, it should be understood that the present invention is not limited thereto and the connection portion may have a monolithic structure through change of a material having a low thermal conductivity.

Referring to FIG. 38, adjacent heat-insulating structural materials 1200 may be connected to each other by welding the connecting portion (periphery portion) 1230.

The heat-insulating structural material according to the present invention may be applied not only to heat insulation systems of liquefied gas cargo tanks, but also to heat-insulating structural materials of buildings, roofs, heat insulation warehouses, and the like. Since a general building suffers from about 40% of heat loss through the roof, it is very important to perform insulation work on the roof. Waterproofing work is also important due to the characteristics of the roof and the roof is fabricated in a firm structure to withstand loads, such as snow, rain and wind.

Indeed, the roof requires various cumbersome tasks including cladding, heat insulation, waterproofing and structural fabrication. However, when the heat-insulating structural material of the present invention is applied thereto, significant reduction in material costs and labor costs can be expected since construction, heat insulation, and waterproofing can be finished through installation of the heat-insulating structural material once.

In addition, the heat-insulating structural material according to the present invention may be applied to bunker tanks of ships. A heavy fuel oil tank requires temperature maintenance and devices for improving fluidity of heavy fuel oil (HFO) through increase in temperature of the heavy fuel oil, which is used as fuel for chemical carriers including various liquid cargo tanks and has a very high viscosity at room temperature.

To this end, various heating devices are provided to the heavy fuel oil tank, thereby increasing the inner temperature of the heavy fuel oil tank to about 100° C.

When the heat-insulating structural material according to the present invention is applied thereto, heat insulation and construction can be finished through installation of the heat-insulating structural material once, thereby ensuring substantial improvement in economic feasibility.

Furthermore, the heat-insulating structural material according to the present invention may be applied to pipes requiring heat insulation.

Typical pipes often require heat insulation for various reasons. In this case, the typical pipe requires cumbersome installation of multiple sheets of heat insulators on a metal pipe and the heat insulators are exposed to an external environment, thereby providing a fundamental problem in terms of maintenance and repair. Currently, a vacuum heat insulator is also machined in a pipe shape. Heat insulation pipes can be easily manufactured in an integral structure using such a vacuum heat insulator and the typical metal pipe. In this case, no additional insulation work is required, thereby simplifying pipe installation while ensuring excellent thermal insulation performance and very convenient maintenance of the pipe.

It should be understood that the thicknesses and shapes of the lower plate, the upper plate, the vacuum heat insulator, the connector, and the like are illustrated by way of example for convenience of description and may be changed in various ways depending upon design conditions.

For example, although a welding bead on the connecting portion between adjacent heat-insulating structural materials is illustrated as being partially formed only on the surface of the metal layer in this embodiment, it should be understood that this structure is provided by way of illustration only for convenience of description and a welding depth or a welding zone may be regulated according to the classification society, such as full penetration, half penetration, and the like. Furthermore, although bonding between metal layers or non-metal layers is not illustrated in description of the connecting portion, it should be understood that bonding strength can be further increased through close contact or bonding.

Furthermore, although the connecting portion is classified into ① the block laminate structure, ② the filling laminate structure, ③ the block step structure, ④ the filling step structure, ⑤ the filling finished structure, and ⑥ the bolt fastening structure, it should be understood that this classification is arbitrarily provided according to the shape of the connecting portion for convenience of description and the present invention is not limited thereto. Although the connecting portion has been illustrated as having the three-stage structure by way of example, it should be understood that the present invention is not limited thereto and the connecting portion may be modified into various structures.

The non-metal layer (intermediate connecting portion) may be entirely or partially formed of the non-foaming polymer. That is, the interior of the non-metal layer may be formed of a metallic material and the surface thereof may be formed of the non-foaming polymer.

Although the lower block 31 and the upper block 32 may be formed of a metallic material in terms of strength, it should be understood that the present invention is not limited thereto and any material having strength corresponding to the metallic material may be used for the lower block 31 and the upper block 32.

The invention claimed is:

1. A heat-insulating structural material comprising:
    a lower plate;
    an upper plate disposed above the lower plate in a thickness direction of the heat- insulating structural material to be separated by a constant distance from the lower plate;
    a connecting portion provided to a first distal end of the lower plate and a second distal end of the upper plate to prevent thermal bridging while securing structural fastening, the connecting portion including a combination of a metal layer and a non-metal layer, the metal layer and the non-metal layer being stacked in the thickness direction, the metal layer and the non-metal layer overlapping with each other in a region outside the first distal end and the second distal end when seen in the thickness direction; and
    a core layer disposed in a space defined by the lower plate, the upper plate and the connecting portion and formed by injecting a liquid non-foaming polymer into the space to be filled therewith, followed by curing the liquid non-foaming polymer.

2. The heat-insulating structural material according to claim 1, further comprising:
    an intermediate layer comprising a heat insulator and disposed between the lower plate and the upper plate.

3. The heat-insulating structural material according to claim 2, wherein the intermediate layer has at least one structure selected from the group of a structure in which the intermediate layer is disposed on a lower surface of the upper plate, a structure in which the intermediate layer is disposed inside the core layer, and a structure in which the intermediate layer is disposed on an upper surface of the lower plate.

4. The heat-insulating structural material according to claim 3, wherein the intermediate layer comprises a vacuum heat insulator and, in the structure in which the intermediate layer is disposed on the lower surface of the upper plate, the intermediate layer is slippable with respect to the upper plate.

5. The heat-insulating structural material according to claim 4, wherein the core layer is air-tightly attached to an inner surface of the space by filling the space with the liquid non-foaming polymer, followed by curing the non-foaming polymer to protect the vacuum heat insulator from external impact while maintaining structural stiffness of the vacuum heat insulator.

6. The heat-insulating structural material according to claim 4, wherein the intermediate layer essentially consists of the vacuum heat insulator and further comprises at least one selected from the group of a vacuum heat insulator surface-protection material, a reinforcing heat insulator and a slip material.

7. The heat-insulating structural material according to claim 4, wherein the core layer is very closely bonded to an inner surface of a box space defined by the lower plate, the upper plate and the connecting portion, and is air-tightly bonded to the vacuum heat insulator to surround and protect the vacuum heat insulator.

8. The heat-insulating structural material according to claim 1, wherein the heat insulator comprises at least one selected from the group of a vacuum heat insulator, an aerogel heat insulator, organic and inorganic slim heat insulators, and an amorphous heat insulator.

9. The heat-insulating structural material according to claim 1, wherein the connecting portion has a laminate structure comprising: a lower connecting portion secured to the lower plate and formed of a metallic material; an upper connecting portion secured to the upper plate and formed of a metallic material; and the non-metal layer interposed as an intermediate connecting portion between the lower connecting portion and the upper connecting portion, and
wherein each of the lower plate and the upper plate extends in a first direction, the thickness direction is a second direction orthogonal to the first direction, and the lower connecting portion, the intermediate connecting portion, and the non-metal layer are stacked in the second direction, a lower surface of the non-metal layer entirely covering an upper surface of the lower connecting portion, an upper surface of the non-metal layer entirely covering a lower surface of the upper connecting portion.

10. The heat-insulating structural material according to claim 9, wherein the non-metal layer of the intermediate connecting portion is provided with a heat insulator and a connector to improve thermal insulation and structural performance.

11. The heat-insulating structural material according to claim 1, wherein the connecting portion has a step structure comprising: a lower connecting portion secured to the lower plate and formed of a metallic material; an upper connecting portion secured to the upper plate and formed of a metallic material; and the non-metal layer interposed as an intermediate connecting portion between the lower connecting portion and the upper connecting portion, and
wherein each of the lower plate and the upper plate extends in a first direction, the non-metal layer having an upper surface that contacts a lower surface of the upper connecting portion and is coplanar with an upper surface of the lower connecting portion, the non-metal layer extending in the first direction farther than the upper connecting portion from the second distal end of the upper plate to form the step structure.

12. The heat-insulating structural material according to claim 1, wherein the connecting portion has a filling step structure comprising: a lower connecting portion secured to the lower plate and formed of a metallic material; an upper connecting portion secured to the upper plate and stepped with respect to the lower connecting portion and formed of a metallic material; and a non-metal layer interposed as an intermediate connecting portion between the lower connecting portion and the upper connecting portion,
the non-metal layer being integrated with the core layer in the course of forming the core layer after a gap between the lower connecting portion and the upper connecting portion is blocked using a temporary blocking member.

13. The heat-insulating structural material according to claim 1, wherein the connecting portion connects adjacent heat-insulating structural materials to each other and has a filling finished structure comprising: a lower connecting portion secured to the lower plate and formed of a metallic material; an upper connecting portion secured to the upper plate and formed of a metallic material; and a non-metal layer interposed as an intermediate connecting portion between the lower connecting portion and the upper connecting portion,
the upper connecting portion being detachably coupled to the upper plate,
a non-foaming polymer being integrated with the core layer by injecting the liquid non-foaming polymer into a space between the upper connecting portion and the lower connecting portion, followed by curing the liquid non-foaming polymer.

14. The heat-insulating structural material according to claim 1, further comprising:
a connector secured between the upper plate and the lower plate.

15. The heat-insulating structural material according to claim 1, wherein the core layer has a weight reduction member therein.

16. The heat-insulating structural material according to claim 1, having: at least one structure of a panel type structure in which one upper plate is disposed on one lower plate to connect adjacent heat-insulating structural materials to each other and an overlap type structure in which a number of upper plates is disposed on one lower plate in a lattice shape.

17. The heat-insulating structural material according to claim 16, wherein, in the overlay type structure, the connecting portion comprises:
a lower connecting portion secured to the lower plate and formed of a metallic material;
an upper connecting portion secured to the upper plate and formed of a metallic material; and
a non-metal layer interposed between the lower connecting portion and the upper connecting portion.

18. The heat-insulating structural material according to claim 1, wherein each of the upper plate and lower plate comprises one of a metal plate and a composite material comprising a metal.

19. The heat-insulating structural material according to claim 18, wherein a vacuum heat insulator is disposed between the upper plate and the lower plate.

20. A heat-insulating structural material comprising:
- an upper metal plate;
- a lower metal plate disposed below the upper metal plate in a thickness direction of the heat-insulating structural material to define a space therebetween;
- a vacuum heat insulator inserted into the space between the upper metal plate and the lower metal plate;
- a non-foaming resin surrounding the entirety of the vacuum heat insulator while being closely bonded to inner surfaces of the upper metal plate and the lower metal plate; and
- a connecting portion provided to a first distal end of the lower plate and a second distal end of the upper plate to prevent thermal bridging while securing structural fastening, the connecting portion including a combination of a metal layer and a non-metal layer, the metal layer and the non-metal layer being stacked in the thickness direction, the metal layer and the non-metal layer overlapping with each other in a region outside the first distal end and the second distal end when seen in the thickness direction.

* * * * *